(12) United States Patent
Adams et al.

(10) Patent No.: US 6,454,099 B1
(45) Date of Patent: *Sep. 24, 2002

(54) VIBRATOR SEPARATOR SCREENS

(75) Inventors: Thomas C. Adams, Hockley, TX (US); David L. Schulte, Broussard, LA (US); Kenneth W. Seyffert, Houston, TX (US); David W. Largent, Cleveland, TX (US); Charles N. Grichar, Houston, TX (US); Guy L. McClung, III, Spring, TX (US)

(73) Assignee: Varco I/P, Inc, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/634,610

(22) Filed: Aug. 5, 2000

Related U.S. Application Data

(63) Continuation-in-part of application No. 09/228,572, filed on Jan. 11, 1999, now Pat. No. 6,152,307, which is a continuation-in-part of application No. 09/183,005, filed on Oct. 30, 1998, now abandoned, which is a continuation-in-part of application No. 09/090,554, filed on Jun. 4, 1998, which is a continuation-in-part of application No. 08/895,976, filed on Jul. 17, 1997, now Pat. No. 5,988,397, which is a continuation-in-part of application No. 08/786,515, filed on Jan. 21, 1997, now Pat. No. 5,971,159, and application No. 08/598,566, filed on Feb. 12, 1996, now abandoned, which is a continuation-in-part of application No. 29/048,575, filed on Jan. 4, 1996, now Pat. No. Des. 377,656, which is a continuation of application No. 29/014,571, filed on Oct. 25, 1993, now Pat. No. Des. 366,040, which is a continuation-in-part of application No. 08/056,123, filed on Apr. 30, 1993, now Pat. No. 5,385,669, and a continuation-in-part of application No. 08/105,696, filed on Aug. 12, 1993, now Pat. No. 5,392,925, and a continuation-in-part of application No. 08/504,495, filed on Jul. 20, 1995, now Pat. No. 5,598,930, and a continuation-in-part of application No. 08/598,566, filed on Feb. 12, 1996, now abandoned, which is a continuation-in-part of application No. 08/220,101, filed on Mar. 30, 1994, now Pat. No. 5,490,598, said application No. 09/634,610, and a continuation-in-part of application No. 09/517,212, filed on Mar. 2, 2000, and a continuation-in-part of application No. 09/544,572, filed on Apr. 6, 2000, and a continuation-in-part of application No. 09/228,572, filed on Jan. 11, 1999, now Pat. No. 6,152,307, and a continuation-in-part of application No. 09/183,003, filed on Oct. 30, 1998.

(51) Int. Cl.$^7$ ................................................. B07B 1/46
(52) U.S. Cl. ...................... 209/399; 209/401; 209/403; 210/489; 210/493.1; 210/498
(58) Field of Search ................................ 209/397, 399, 209/401, 403, 405, 409; 210/488, 489, 493.1, 493.5, 498, 499

(56) References Cited

U.S. PATENT DOCUMENTS 40,242 A    10/1863   Capell (List continued on next page.)

FOREIGN PATENT DOCUMENTS

DE         2912228 A    10/1980

(List continued on next page.)

OTHER PUBLICATIONS

U.S. application S.N. 08/282,983; filed Jul. 29, 1994 entitled "Shale Shaker Screens," co-owned with present invention/application.

(List continued on next page.)

Primary Examiner—Tuan N. Nguyen
(74) Attorney, Agent, or Firm—Guy McClung

(57) ABSTRACT

A screen assembly for a vibratory separator has been invented, which, in certain aspects, has a ridge-valley series of undulating screening material with a plurality of alternating ridges and valleys of screening material, each of said ridges having two spaced-apart ridge ends, a ridge top and a ridge bottom, and each ridge end with a portion of screening material that tapers down from its corresponding ridge's ridge top to a level of screening material at its corresponding ridge's ridge bottom.

13 Claims, 23 Drawing Sheets

U.S. PATENT DOCUMENTS

| | | | |
|---|---|---|---|
| 236,416 A | 1/1881 | Bourne | |
| 246,144 A | 8/1881 | Keeler | |
| 268,491 A | 12/1882 | Hubbell | |
| 275,190 A | 4/1883 | Gilbert | |
| 275,340 A | 4/1883 | Kimball | |
| 500,302 A | 6/1893 | Stoecket et al. | |
| 516,673 A | 3/1894 | Wilson | |
| 526,562 A | 9/1894 | Cross | |
| 560,858 A | 5/1896 | Missroon | |
| 583,981 A | 6/1897 | Plaisted | |
| 607,598 A | 7/1898 | Closz | |
| 777,317 A | 12/1904 | Traylor | |
| 865,185 A | 9/1907 | Kerrigan | |
| 948,222 A | 2/1910 | Honabach | |
| 964,897 A | 7/1910 | Bryant | |
| 966,578 A | 8/1910 | Murphy et al. | 209/401 X |
| 984,866 A | 2/1911 | Tata | |
| 1,082,612 A | 12/1913 | Smith et al. | |
| 1,098,979 A | 6/1914 | Schuchard | |
| 1,132,667 A | 3/1915 | Milliot | |
| 1,139,041 A | 5/1915 | Larson | |
| 1,242,982 A | 10/1917 | Reynolds | |
| 1,248,081 A | 11/1917 | Couch | |
| 1,250,768 A | 12/1917 | Baumgartner | 209/392 |
| 1,344,747 A | 6/1920 | Wright | |
| 1,359,426 A | 11/1920 | Plaisted | |
| 1,397,339 A | 11/1921 | Sturtevant | |
| 1,423,021 A | 7/1922 | Reynolds | |
| 1,462,804 A | 7/1923 | Evans | |
| 1,505,735 A | 8/1924 | Stebbins | |
| 1,561,632 A | 11/1925 | Woodward | |
| 1,626,774 A | 5/1927 | Allan | |
| 1,614,586 A | 10/1927 | Anderson et al. | |
| 1,678,941 A | 7/1928 | Helman | |
| 1,713,143 A | 5/1929 | Overstrom | |
| 1,716,758 A | 6/1929 | Bland | |
| 1,785,195 A | 12/1930 | Hoes et al. | |
| 1,822,298 A | 9/1931 | Kerrigan | |
| 1,879,377 A | 9/1932 | McNeely | |
| 1,950,861 A | 3/1934 | O'Toole, Sr. | |
| 1,997,713 A | 4/1935 | Boehm | |
| 1,997,740 A | 4/1935 | Nickerson | |
| 2,052,467 A | 8/1936 | Hermann | 209/401 |
| 2,061,850 A | 11/1936 | Roberts | |
| 2,082,513 A | 6/1937 | Roberts | |
| 2,089,548 A | 8/1937 | Frantz et al. | |
| 2,104,785 A | 1/1938 | Akeyson | 210/384 |
| 2,190,262 A | 2/1940 | Geist | |
| 2,251,909 A | 8/1941 | Lindsay | 210/149 |
| 2,274,700 A | 3/1942 | Jenks | |
| 2,335,084 A | 11/1943 | Rice | 209/408 |
| 2,406,051 A | 8/1946 | Weiss | |
| 2,462,878 A | 3/1949 | Logue | |
| 2,480,320 A | 8/1949 | Carrier | 210/388 |
| 2,511,239 A | 6/1950 | Behnke et al. | 209/403 |
| 2,648,441 A | 8/1953 | Soldan | |
| 2,667,975 A | 2/1954 | Seaholm | 210/152 |
| 2,670,079 A | 2/1954 | Bette | 209/405 |
| 2,677,462 A | 5/1954 | Conkling | 209/403 |
| 2,723,032 A | 11/1955 | Gisler et al. | |
| 2,726,184 A | 12/1955 | Cox et al. | |
| 2,774,477 A | 12/1956 | Pollitz | 209/403 |
| 2,800,227 A | 7/1957 | Kiger | 209/412 X |
| 2,813,629 A | 11/1957 | Brugmann | 209/403 |
| 2,827,169 A | 3/1958 | Cusi | |
| 2,902,165 A | 9/1959 | Imershein | |
| 2,929,464 A | 3/1960 | Sprouse | |
| 2,973,865 A | 3/1961 | Cibula | 209/392 X |
| 2,980,208 A | 4/1961 | Neumann | |
| 2,985,303 A | 5/1961 | Wright | |
| 3,057,481 A | 10/1962 | Pale | 210/493 |
| 3,070,231 A | 12/1962 | McCorkel et al. | 209/319 |
| 3,092,573 A | 6/1963 | Lambert et al. | 209/403 |
| 3,165,473 A | 1/1965 | Pall et al. | 210/510 |
| 3,176,643 A | 4/1965 | Hoskins et al. | 209/403 |
| 3,243,943 A | 4/1966 | Getzin | 55/499 |
| 3,255,885 A | 6/1966 | Burls | 209/314 |
| 3,285,413 A | 11/1966 | Taylor-Smith | |
| 3,458,978 A | 8/1969 | Davis | 55/499 |
| 3,465,413 A | 9/1969 | Rosaen et al. | |
| 3,542,636 A | 11/1970 | Wandel | 161/114 |
| 3,574,103 A | 4/1971 | Latkin | 428/72 |
| 3,655,060 A | 4/1972 | Hagdahl | 210/493 |
| 3,679,057 A | 7/1972 | Perez | 210/223 |
| 3,716,138 A | 2/1973 | Lumsden | 209/401 |
| 3,747,770 A | 7/1973 | Zentis | 210/402 |
| 3,747,772 A | 7/1973 | Brown | 210/493 |
| 3,789,498 A | 2/1974 | Cole | 29/470.9 |
| 3,793,692 A | 2/1974 | Tate et al. | 29/163.5 |
| 3,853,529 A | 12/1974 | Boothe et al. | 55/499 |
| 3,900,628 A | 8/1975 | Stewart | |
| 3,929,642 A | 12/1975 | Ennis et al. | 210/113 |
| 3,970,549 A | 7/1976 | Ennis et al. | 209/341 |
| 4,019,987 A | 4/1977 | Krashow | 210/232 |
| 4,022,596 A | 5/1977 | Pedersen | 55/528 |
| 4,033,865 A | 7/1977 | Derrick, Jr. | 209/275 |
| 4,062,769 A | 12/1977 | Simonson | 209/399 |
| 4,065,382 A | 12/1977 | Derrick, Jr. | 209/313 |
| 4,075,106 A | 2/1978 | Yamazaki | 210/487 |
| 4,138,303 A | 2/1979 | Taylor | 156/264 |
| 4,380,494 A | 4/1983 | Wilson | 209/319 |
| 4,410,427 A | 10/1983 | Wydeven | 210/317 |
| 4,464,242 A | 8/1984 | Boulton | 204/253 |
| 4,472,473 A | 9/1984 | Davis et al. | 428/184 |
| 4,546,783 A | 10/1985 | Lott | 134/109 |
| 4,575,421 A | 3/1986 | Derrick et al. | 209/397 |
| 4,582,597 A | 4/1986 | Huber | 204/313 |
| 4,589,983 A | 5/1986 | Wydevan | 210/317 |
| 4,617,122 A | 10/1986 | Kruse et al. | 210/493.3 |
| 4,634,535 A | 1/1987 | Lott | 210/780 |
| 4,678,578 A | 7/1987 | Nodes et al. | 210/445 |
| 4,696,751 A | 9/1987 | Eifling | 210/780 |
| 4,728,422 A | 3/1988 | Bailey | 210/314 |
| 4,769,968 A | 9/1988 | Davis et al. | 52/814 |
| 4,819,809 A | 4/1989 | Derrick | 209/275 |
| 4,820,407 A | 4/1989 | Lilie | 209/397 |
| 4,832,834 A | 5/1989 | Baird, Jr. | 209/397 |
| 4,857,176 A | 8/1989 | Derrick et al. | 209/392 |
| 4,882,044 A | 11/1989 | Friessle | 209/319 |
| 4,882,054 A | 11/1989 | Derrick et al. | 210/389 |
| 4,892,767 A | 1/1990 | Freissle | 428/52 |
| 4,940,500 A | 7/1990 | Tadokoro et al. | 156/204 |
| 4,954,249 A | 9/1990 | Gero et al. | 209/273 |
| 5,028,474 A | 7/1991 | Czaplicki | 428/178 |
| 5,056,286 A | 10/1991 | Bokor | 52/483 |
| 5,084,178 A | 1/1992 | Miller et al. | 210/493.5 |
| 5,137,622 A | 8/1992 | Souter | 209/403 |
| 5,139,154 A | 8/1992 | Gero et al. | 209/273 |
| 5,162,143 A | 11/1992 | Porter et al. | 428/179 |
| 5,167,740 A | 12/1992 | Michaelis et al. | 156/73.1 |
| 5,211,291 A | 5/1993 | Kelley et al. | 209/680 |
| 5,221,008 A | 6/1993 | Derrick, Jr. et al. | 209/269 |
| 5,256,292 A | 10/1993 | Cagle | 210/499 |
| 5,312,508 A | 5/1994 | Chisholm | 156/292 |
| 5,330,057 A | 7/1994 | Schiller et al. | 209/392 |
| 5,385,669 A | 1/1995 | Leone, Sr. | 210/488 |
| 5,392,925 A | 2/1995 | Seyffert | 209/405 |
| 5,417,793 A | 5/1995 | Bakula | 156/308.2 |
| 5,417,858 A | 5/1995 | Derrick et al. | 210/388 |
| 5,417,859 A | 5/1995 | Bakula | 210/388 |
| H1481 H | 9/1995 | Ray | 428/98 |

| | | | |
|---|---|---|---|
| 5,490,598 A | 2/1996 | Adams | 209/403 X |
| 5,614,094 A | 3/1997 | Deister et al. | 210/388 |
| 5,636,749 A | 6/1997 | Wojciechowski | 209/403 |
| 5,720,881 A | 2/1998 | Derrick et al. | 210/388 |
| 5,783,077 A | 7/1998 | Bakula | 210/388 |
| 5,814,218 A | 9/1998 | Cagle | 210/388 |
| 5,851,393 A | 12/1998 | Carr et al. | 204/489 |
| 5,868,929 A | 2/1999 | Derrick et al. | 210/388 |
| 5,876,552 A | 3/1999 | Bakula | 156/308.2 |
| 5,921,399 A | 7/1999 | Bakula et al. | 209/272 |
| 5,944,993 A | 8/1999 | Derrick et al. | 210/388 |
| 5,950,841 A | 9/1999 | Knox et al. | 209/315 |
| 5,958,236 A | 9/1999 | Bakula | 210/388 |
| 6,269,953 B1 * | 8/2001 | Seyffert et al. | 209/403 X |
| 6,290,068 B1 * | 9/2001 | Adams et al. | 209/401 |

FOREIGN PATENT DOCUMENTS

| | | |
|---|---|---|
| DE | 3827259 A | 4/1989 |
| DE | 8904477 U | 11/1989 |
| DE | 43 10 129 C1 | 3/1993 |
| GB | 269877 | 4/1928 |
| GB | 519680 | 4/1939 |
| GB | 823648 | 11/1957 |
| GB | 2161715 A | 1/1986 |
| GB | 2161715 B | 6/1988 |
| GB | 2124099 A | 2/1994 |
| GB | 1412975 | 11/1995 |
| JP | 59-142818 | 8/1984 |
| WO | PCT/GB91/00957 | 1/1991 |
| WO | WO 9200133 A | 1/1992 |
| WO | PCT/US94/00243 | 1/1994 |
| WO | WO 9415723 A | 7/1994 |
| WO | PCT/EP96/03103 | 2/1996 |
| WO | WO 9611070 A | 4/1996 |
| WO | WO 9703765 A | 2/1997 |
| WO | WO 9523655 A | 9/1998 |
| WO | WO 00/25942 | 11/1999 |
| WO | WO 00/64558 | 3/2000 |

OTHER PUBLICATIONS

"Derrick Sandwich Shaker," Derrick Equipment Co. (Prior to 1992).
"The Future of Fine Screening," Derrick Equipment Co. 1993.
"Derrick Pyramid Screens," Derrick Corp.
"Advanced Wirecloth, Inc.," Advanced Wirecloth, Inc., 1993.
"CPI Group, Inc.," CPI Group, Inc., 1990.
"LM3 Full–Flo Shale Shaker," Sweco Oilfield Services, 1991.
Pending U.S. application 08/220,101 filed Mar. 94 entitled "Screen For Vibrating Separator.".
Amendment Under 37 CFR 1.115 in pending U.S. S.N. 08/220,101.
Offical Gazette Entry for U.S. Patent 5,626,234, May 6, 1997.
The Brandt Company General Catalog 1982–1983, 4 pages, 1982.
Take the Drilled Solids Out, The Brandt Company, Sep. 1980.
Sweco Full–Flow, Sweco, Inc. 1992.
Catalog 105 H&K Perforated Materials, Harrington & King-Perforating Co., 1988.
Sweco Oilfield Services, Composite Catalog, 1992.
Screening Equipment Handbook, Pankratz, 1988.
Supertaut Mud Cleaner Screens, Sweco Oilfield Services, 1992.
Filtration & Separation, Flo Trend Systems, Inc. 1989.
Clean Liquids/Dry Solids, Flo Trend Systems, Inc. 1989.
Menally Coal Preparation Manual M 576, pp. 111, 73–96, 216 (1978).
Layered Shale Shaker Screens Improve Mud Solids Control, World Oil, 1978.
Int'l Search Report, PCT/GB97/00385 co–owned with present application.
Int'l Search Report, PCT/GB00/03571, PCT Counterpart of present case.
Mud Equipment Manual Handbook 3: Shale Shakers, Brandt & Love, Gulf Pub. Co., 1982.
An Innovative Method of ranking Shale Shaker Screens, STC05, Shale Shaker Technology Conference, Feb. 1991.

* cited by examiner

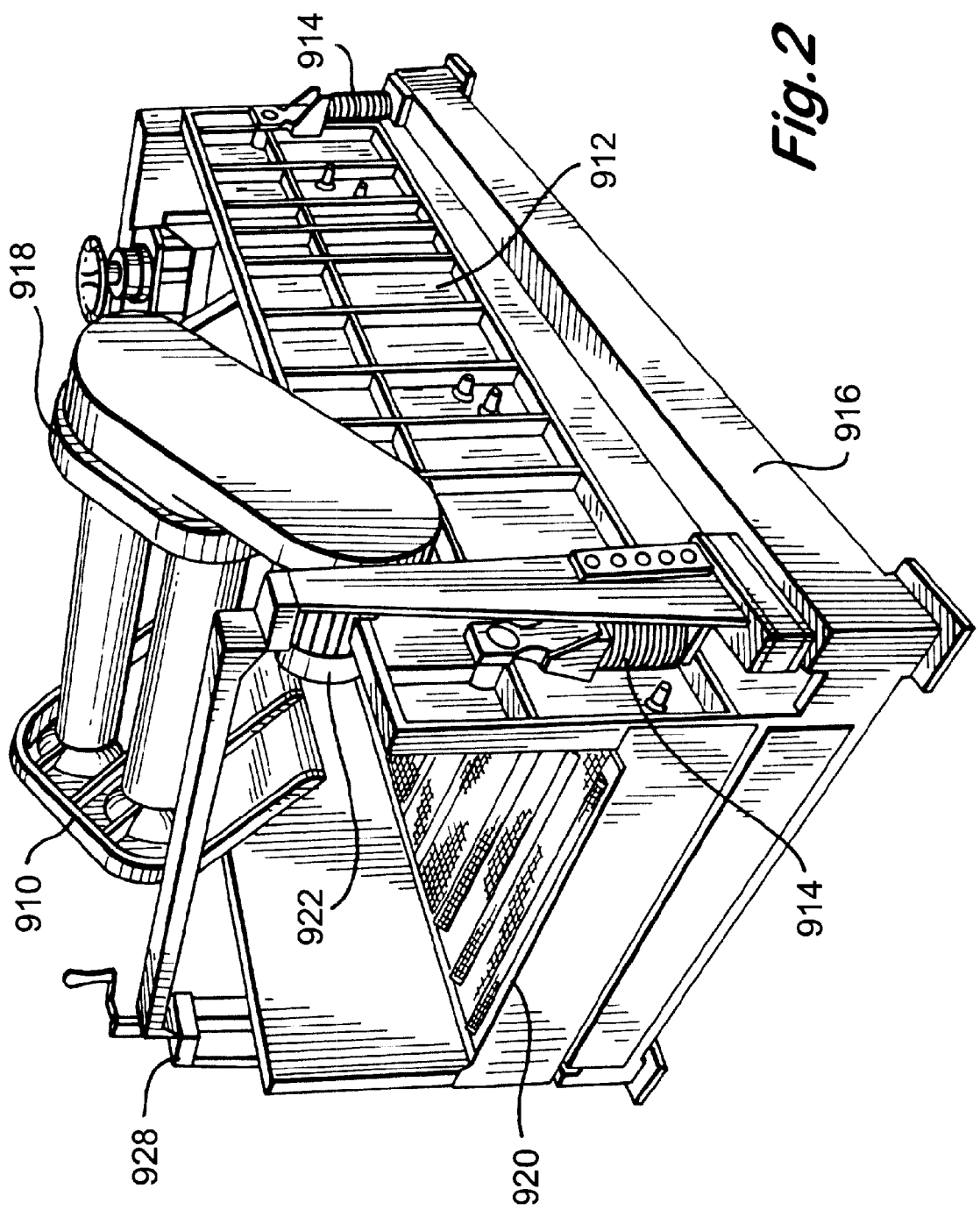

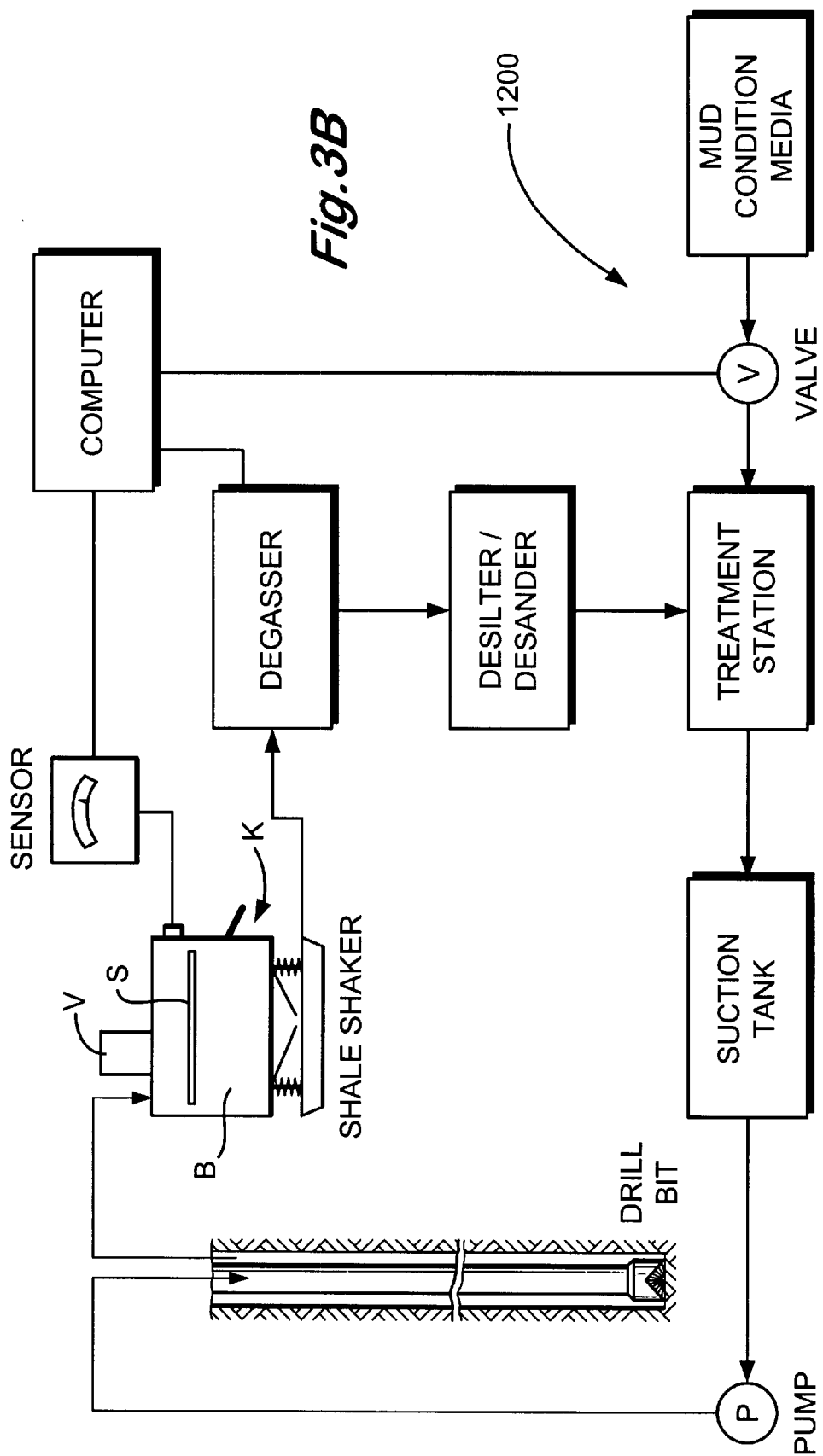

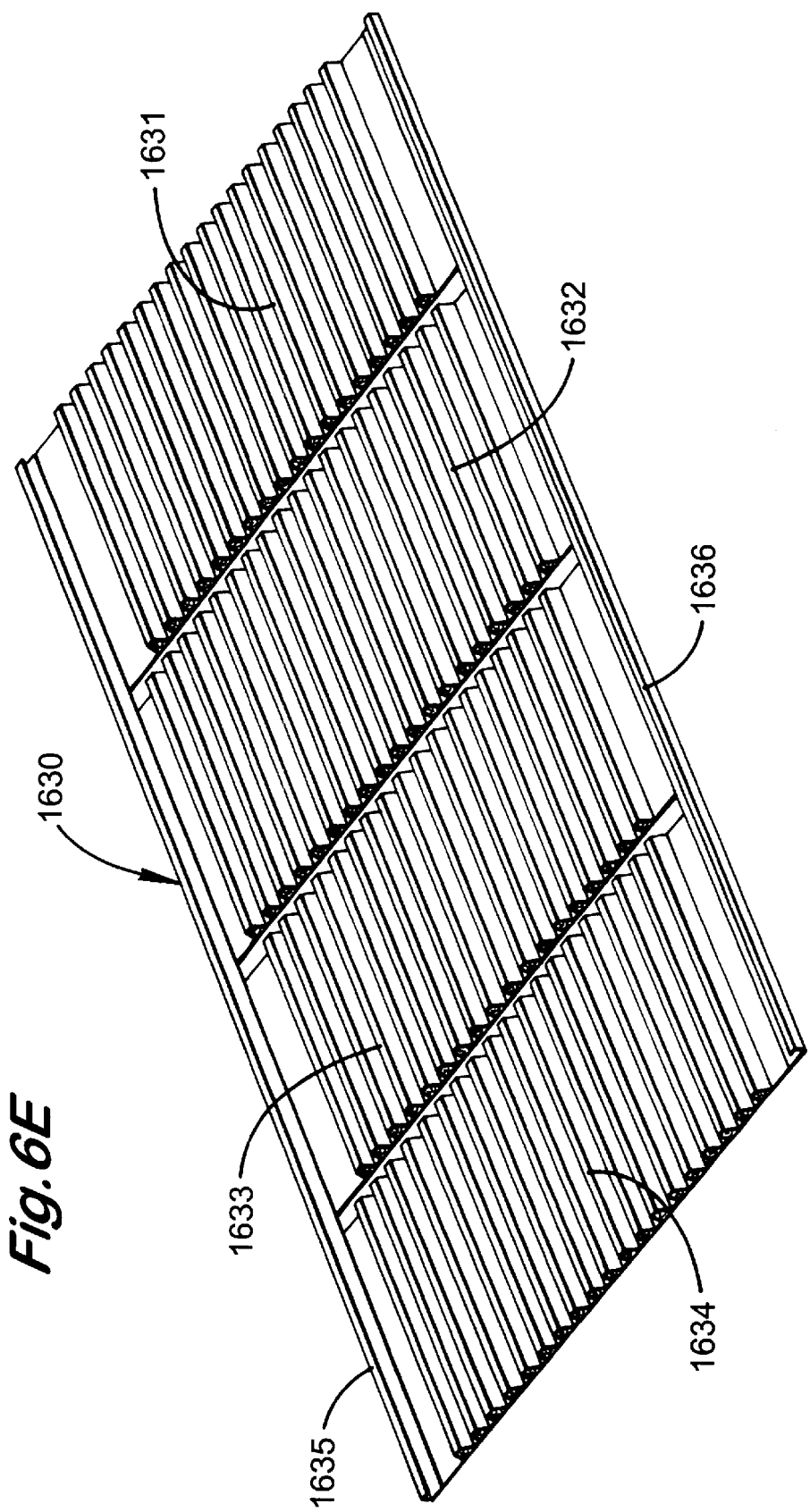

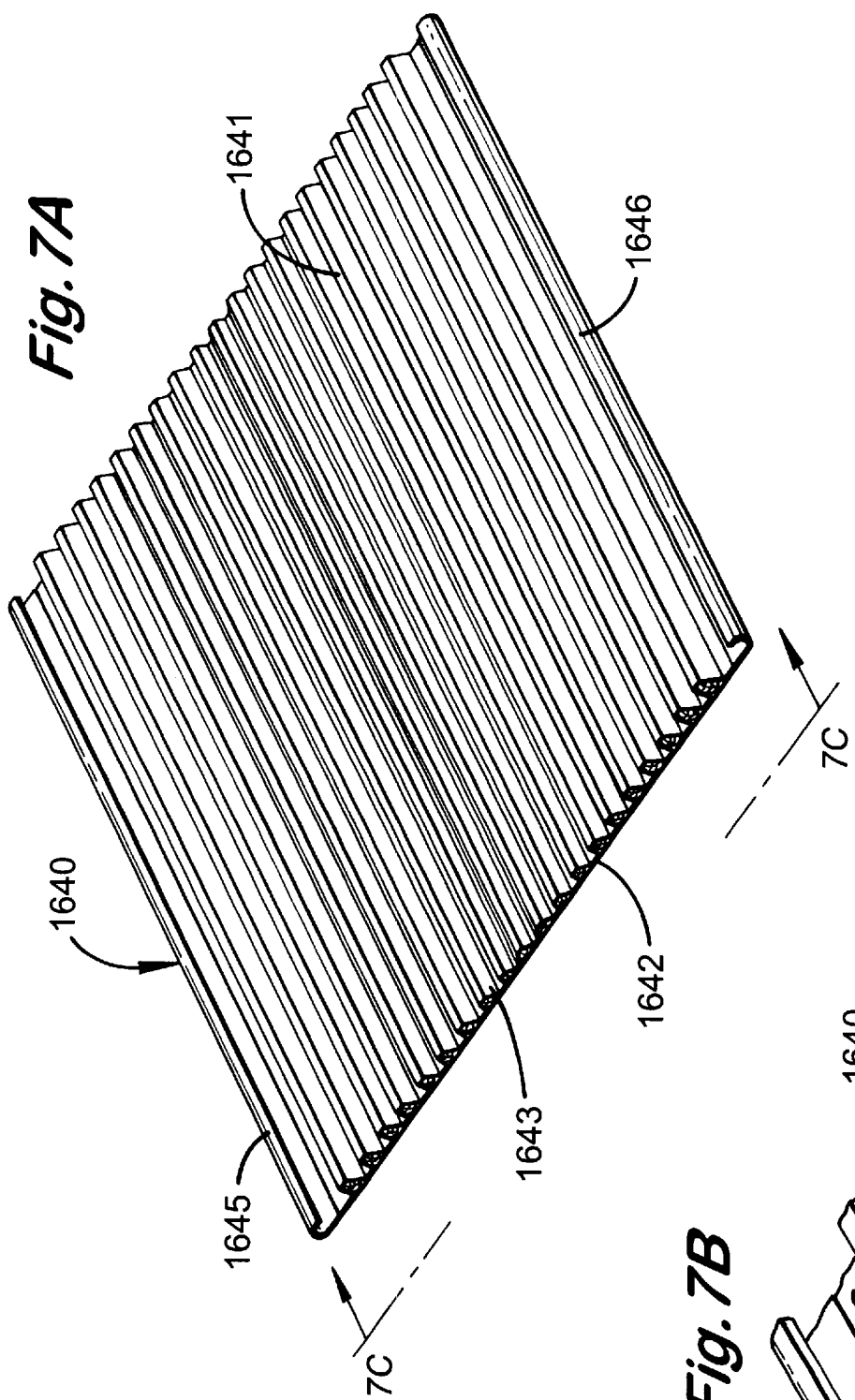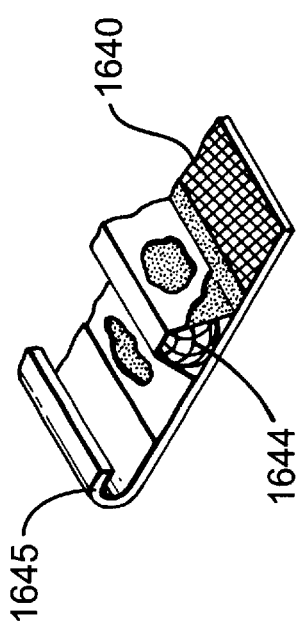

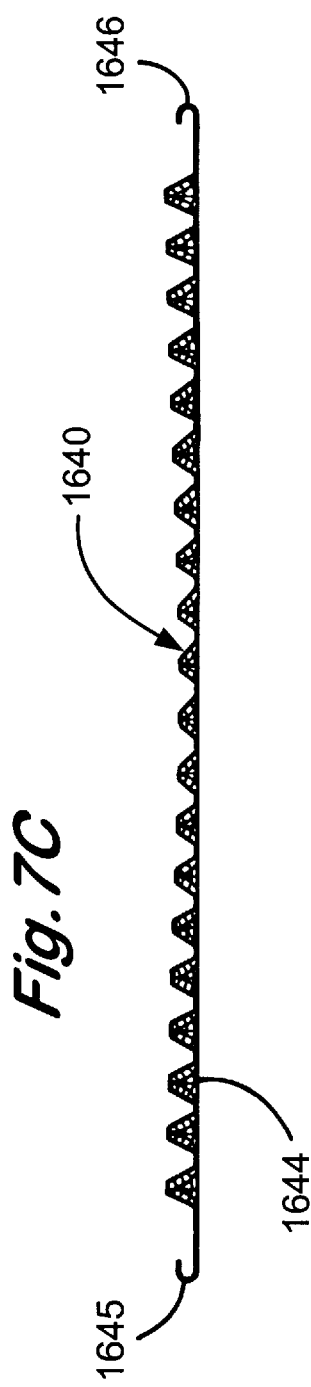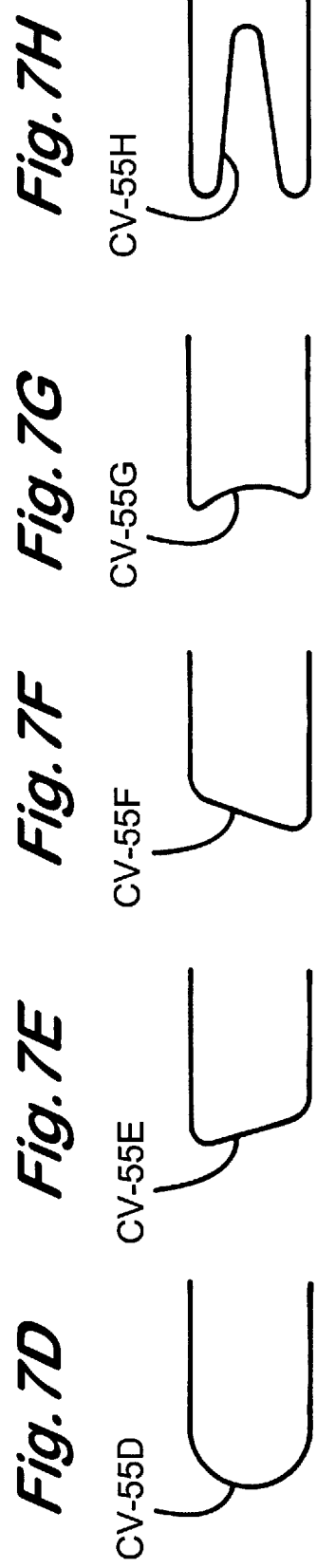

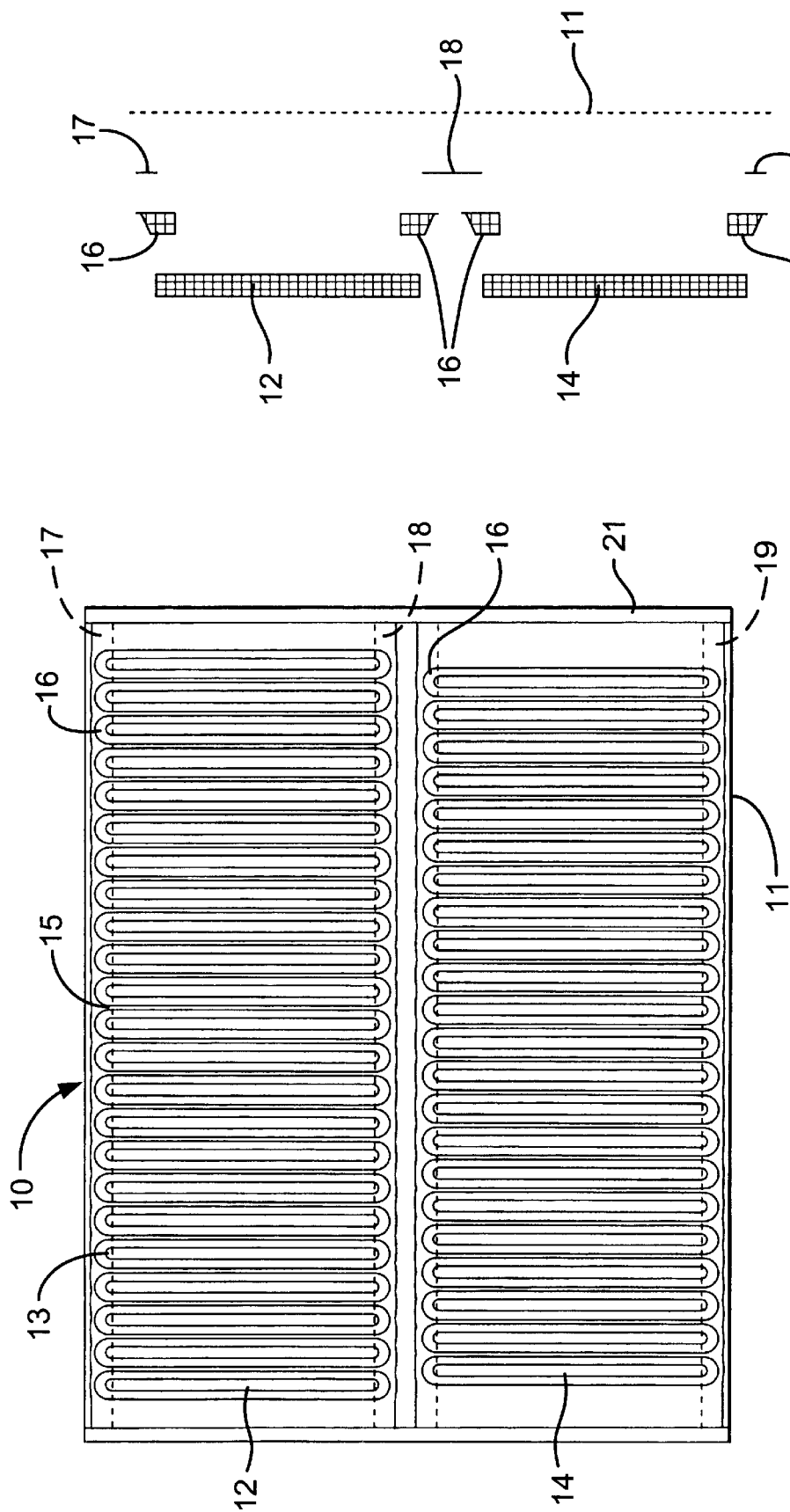

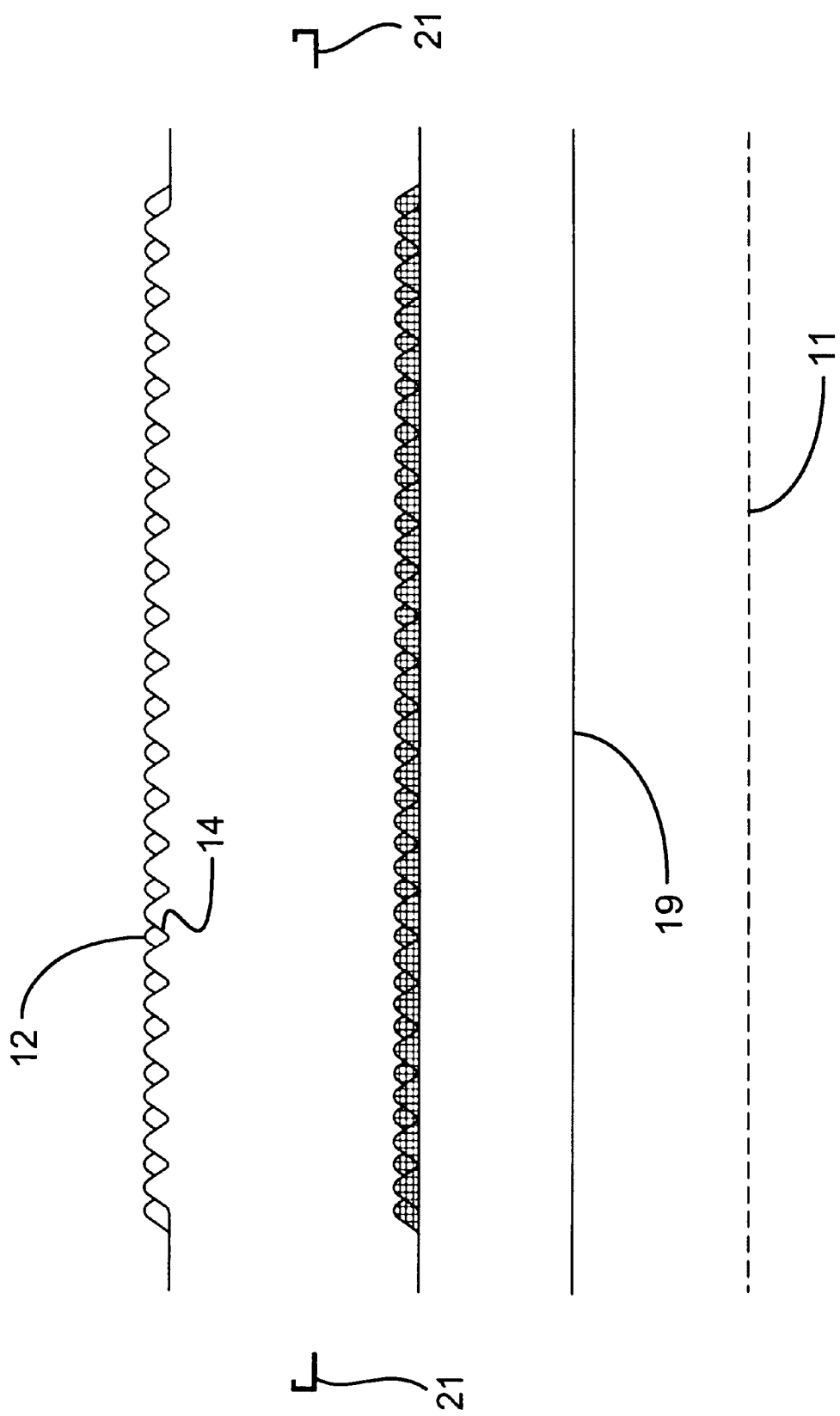

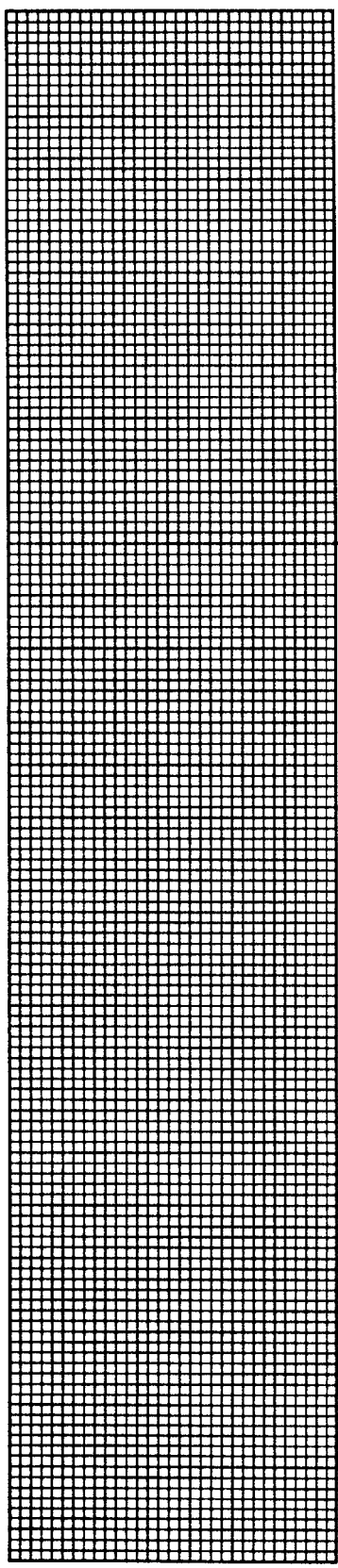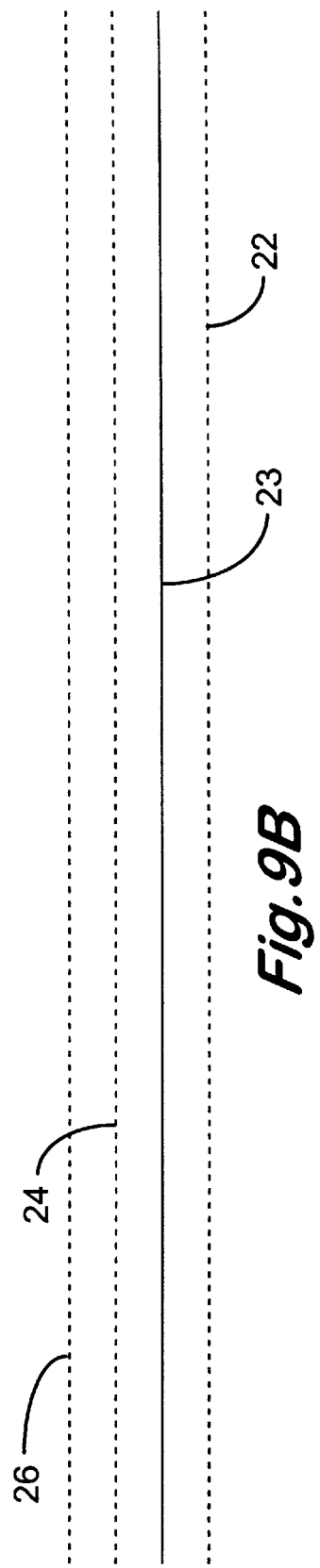
Fig.9A
Fig.9B
Fig.9C

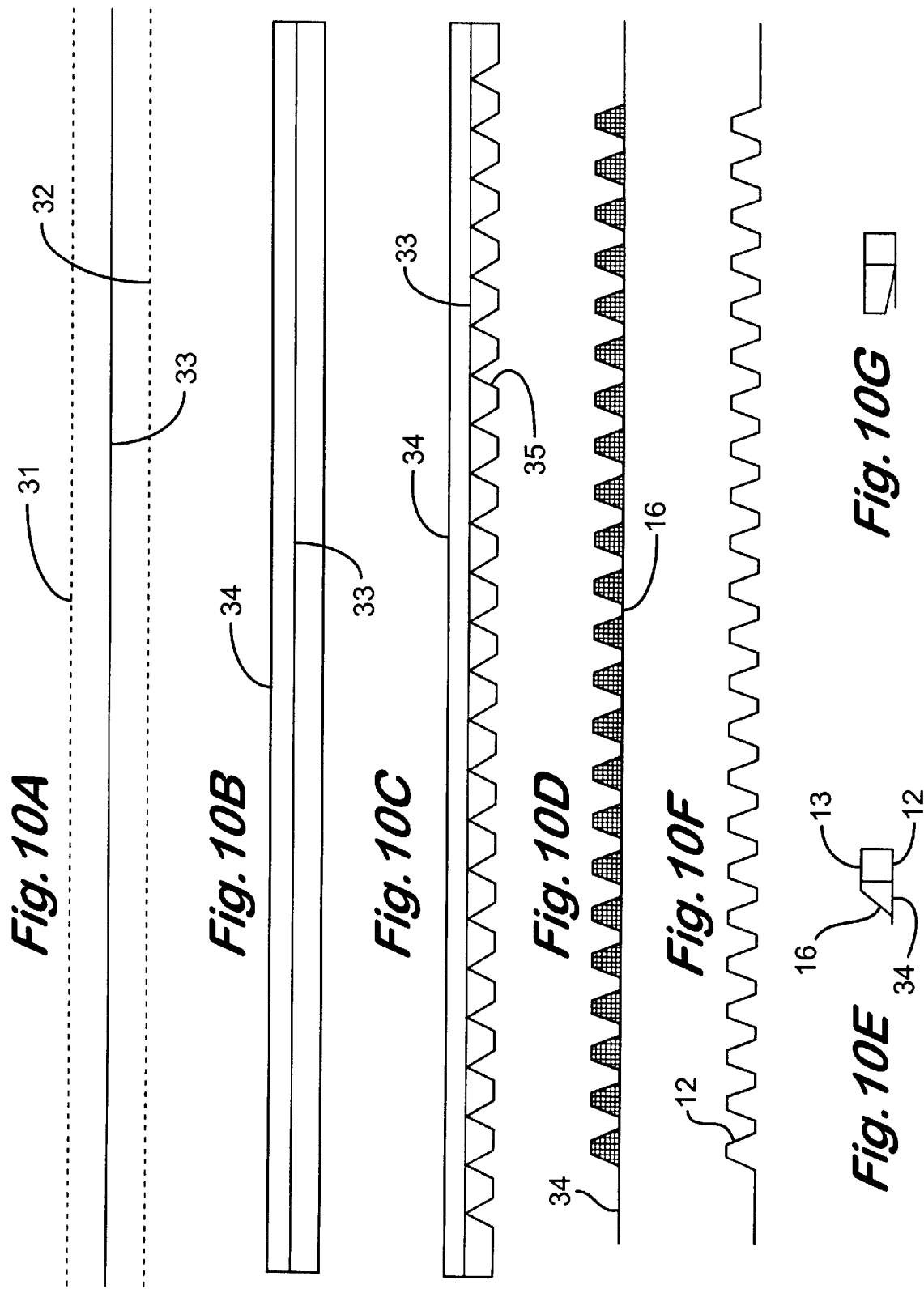

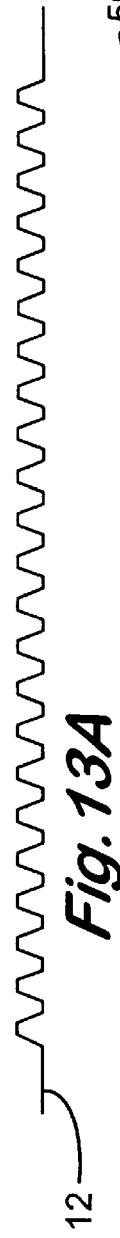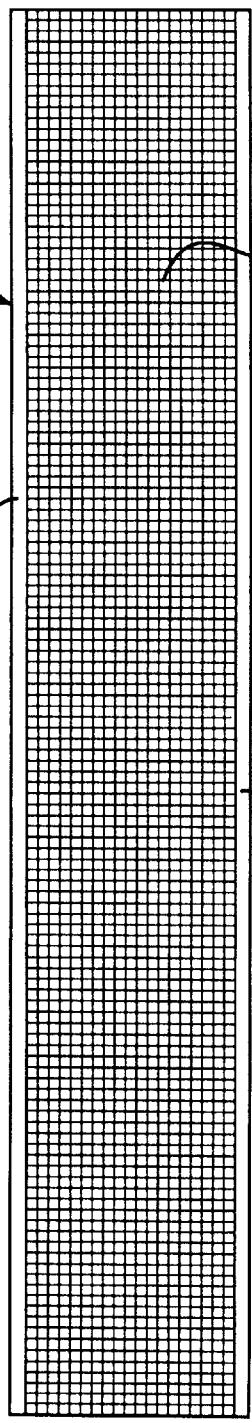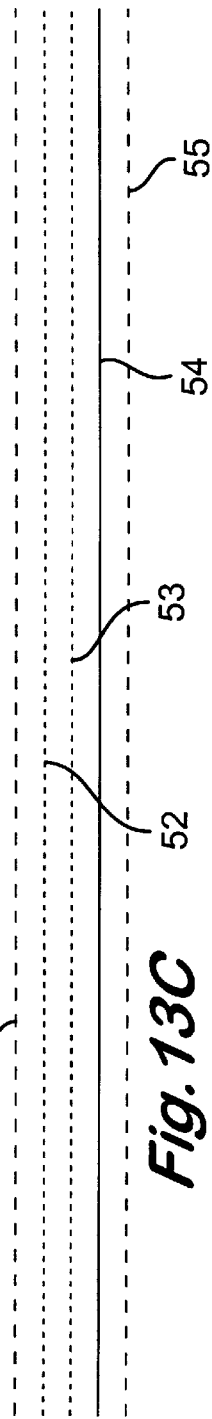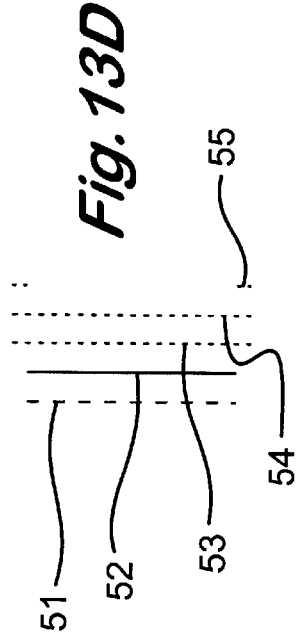
Fig. 13A
Fig. 13B
Fig. 13C
Fig. 13D

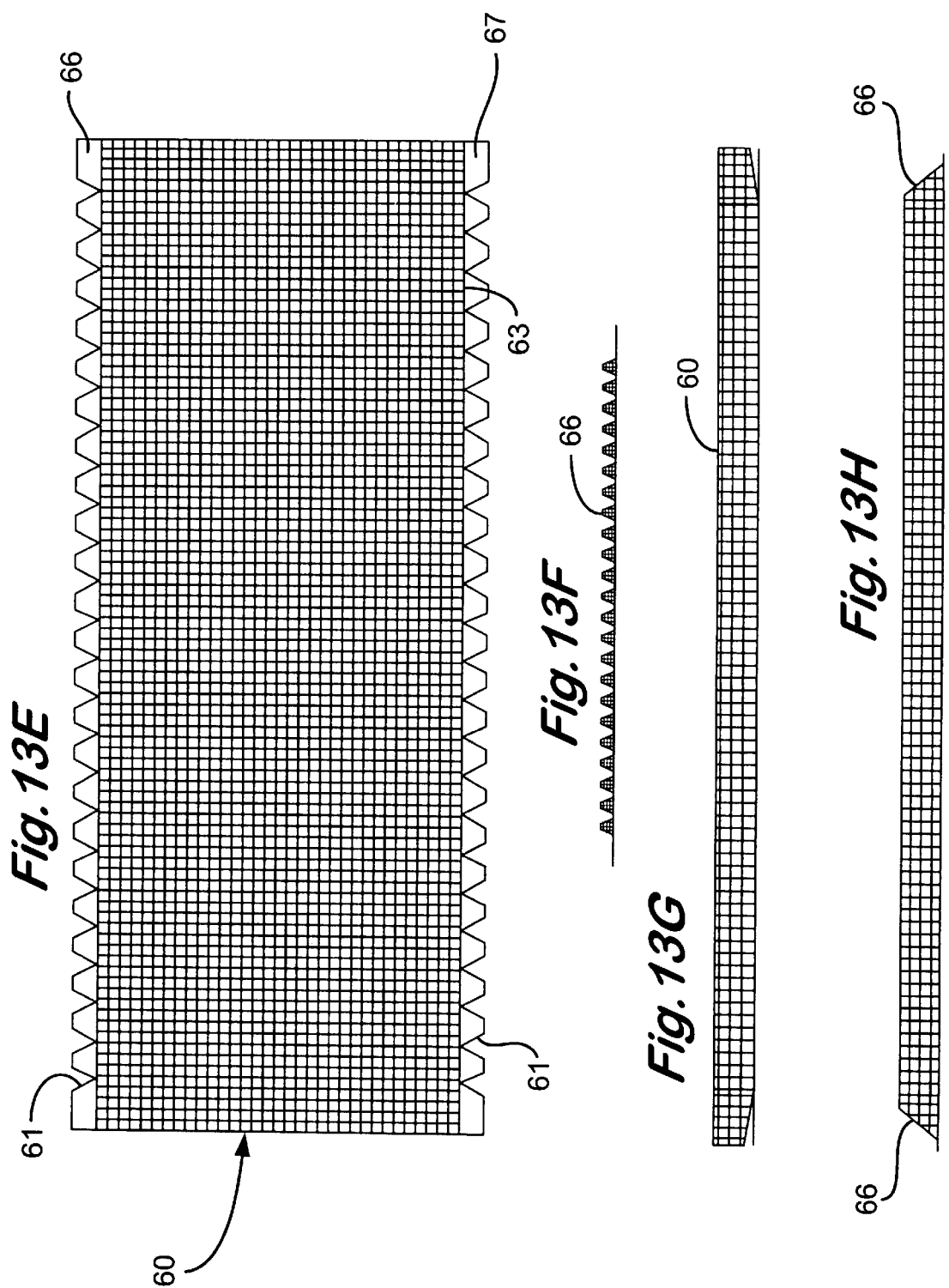

VIBRATOR SEPARATOR SCREENS

RELATED APPLICATIONS

This is a continuation-in-part of U.S. application Ser. No. 09/228,572 filed Jan. 11, 1999 is now U.S. Pat. No. 6,152, 307 entitled which is a continuation-in-part of U.S. application Ser. No. 09/183,005 filed Oct. 30, 1998 now abandoned, which is a continuation-in-part of U.S. application Ser. No. 09/090,554 filed Jun. 4, 1998 which is a continuation-in-part of U.S. application Ser. No. 08/895,976 filed Jul. 17, 1997 is now U.S. Pat. No. 5,988,397 which is a continuation-in-part of U.S. application Ser. No. 08/786, 515 filed Jan. 21, 1997 is now U.S. Pat. No. 5,971,759 and of U.S. application Ser. No. 08/598,566 filed Feb. 12, 1996 now abandoned which is a continuation in part of the following co-owned applications and patents: U.S. Ser. No. 29/048,575 filed Jan. 4, 1996, now U.S. Patent D 377,656 issued Jan. 28 1997 which is a continuation of U.S. Ser No. 29/014,571 filed Oct. 25, 1993, now U.S. Patent D 366,040 issued on Jan. 9, 1996 which is a continuation of 08/056123 filed Apr. 30, 1993 now U.S. Pat. No. 5,385,699; which is a continuation-in-part of U.S. applications Ser. No. 08/56123 filed Apr. 30, 1993, now U.S. Pat. No. 5,385,669 issued on Jan 31, 1995; and Ser. No. 08/105,696 filed Aug. 12, 1993, now U.S. Pat. No. 5,392,925 issued on Feb. 28, 1995; U.S. Ser. No. 08/504,495 filed Jul. 20, 1995 is now U.S. Pat. No. 5,598,930; U.S. Ser. No. 08/598,566 filed Feb. 12, 1996 now abandoned which is a continuation-in-part of U.S. Ser. No. 08/220,101 filed Mar. 30, 1994 now U.S. Pat. No. 5,490,598 issued Feb. 13, 1996. This is a continuation-in-part of U.S. applications Ser. Nos. 09/517,212 filed Mar. 2, 2000; 09/544,572 filed Apr. 6, 2000; 09/228,572 filed Jan. 11, 1999 is now U.S. Pat. No 6,152,307; and 09/183,003 filed Oct. 30, 1998. All of these related applications and patents are incorporated herein in their entirety for all purposes.

BACKGROUND OF THE INVENTION

1. Field of the Invention

The present invention is directed to screens for vibratory separators, shale shakers, screens for classifying and/or filtering material, and such screens, in certain aspects, with one or more ridge end openings covered with or made integrally from non-flat and/or seamless material.

2. Description of Related Art

The need for solids control in drilling mud used in hydrocarbon well drilling is well known in the prior art. Drilling mud, typically a mixture of clay and water and various additives, is pumped down through a hollow drill string (pipe, drill collar, bit, etc.) into a well being drilled and exits through holes in a drillbit. The mud picks up cuttings (rock) and other solids from the well and carries them upwardly away from the bit and out of the well in a space between the well walls and the drill string. At the top of the well, the solids-laden mud is discharged over a shale shaker, a device which typically has a series of screens arranged in tiered or flat disposition with respect to each other. The prior art discloses a wide variety of vibrating screens, devices which use them, shale shakers, and screens for shale shakers. The screens catch and remove solids from the mud as the mud passes through them. If drilled solids are not removed from the mud used during the drilling operation, recirculation of the drilled solids can create weight, viscosity, and gel problems in the mud, as well as increasing wear on mud pumps and other mechanical equipment used for drilling.

In some shale shakers a fine screen cloth is used with the vibrating screen. The screen may have two or more overlying layers of screen cloth. The prior art discloses that the layers may be bonded together; and that a support, supports, or a perforated or apertured plate may be used beneath the screen or screens. The frame of the vibrating screen is resiliently suspended or mounted upon a support and is caused to vibrate by a vibrating mechanism, e.g. an unbalanced weight on a rotating shaft connected to the frame. Each screen may be vibrated by vibratory equipment to create a flow of trapped solids on top surfaces of the screen for removal and disposal of solids. The fineness or coarseness of the mesh of a screen may vary depending upon mud flow rate and the size of the solids to be removed.

Many screens used with shale shakers are flat or nearly flat (i.e. substantially two-dimensional). Other screens, due to corrugated, depressed, or raised surfaces are three-dimensional. U.S. Pat. Nos. 5,417,793; 5,417,858; and 5,417,859 disclose non-flat screens for use with shale shakers. These screens have a lower planar apertured plate with a multiplicity of spaced-apart apertures or openings therethrough. Undersides of troughs of undulating screening material are bonded to the apertured plate. Such screens present a variety of problems, deficiencies, and disadvantages, including: decreased flow area due to area occluded by solid parts of the apertured plate; necessity to either purchase relatively expensive apertured plate or provide for in-house perforating of a solid plate; plate weight increases wear on parts such as rubber screen supports or cushions and can inhibit required vibration; large plate surface area requires relatively large amount of bonding means for bonding screens to the plate; and a finished screen which is relatively heavy increases handling problems, hazards, and cost of shipping.

Vibrating screens have been employed for many years to separate particles in a wide array of industrial applications. One common application of vibrating screens is in drilling operations to separate particles suspended in drilling fluids. The screens are generally flat and are mounted generally horizontally on a vibrating mechanism or shaker that imparts either a rapidly reciprocating linear, elliptical or circular motion to the screen. Material from which particles are to be separated is poured onto a back end of the vibrating screen, usually from a pan mounted above the screen. The material generally flows toward the front end of the screen. Large particles are unable to move through the screen remaining on top of the screen and moving toward the front of the screen where they are collected. The smaller particles and fluid flows through the screen and collects in a pan beneath the screen.

A vibrating screen may be formed from one or more layers of wire mesh. Wire mesh is generally described with reference to the diameter of the wires from which it is woven, the number wires per unit length (called a mesh count) and the shape or size of the openings between wires. Wire mesh comes in various grades. "Market" grade mesh generally has wires of relative large diameter. "Mill" grade has comparatively smaller diameter wires and "bolting cloth" may have the smallest diameter wire. The type of mesh chosen depends on the application.

U.S. Pat. No. 5,417,858 discloses screen assemblies for vibrating screening machines which have screen ridge openings blocked by bent over portions of screens. The screens are on top of a plate. The screen portions are joined along a seam, e.g. by adhesive, welding, brazing or in any suitable manner. A lower most side of the screen covering portion is sealed to the plate along a joint. The thus-formed ridge opening cover is flat, does not project outwardly beyond the ridge end or beyond the plate, and requires a seam that somehow connects two bent-over screen portions. There is no teaching or suggestion in this patent of: an integral curved rounded or bulbous ridge end; a seamless cover for a ridge opening or a seamless ridge end; a non-flat or bulbous ridge end or cover for a ridge opening; of a ridge end that tapers from a ridge top down to a bottom level of screening material or of a ridge end that is not plugged but is integrally formed of screen and/or mesh material.

The related art section of each of the above-identified applications and patents is incorporated here fully by reference.

SUMMARY OF THE PRESENT INVENTION

The present invention discloses, in certain aspects, a screen assembly for a vibratory separator or shale shaker, the screen assembly having a ridge-valley series of screening material with a plurality of alternating ridges and valleys, each of the ridges with two spaced-apart ridge ends, a ridge top and a ridge bottom, and each ridge end having a portion of screening material that tapers down from its corresponding ridge's ridge top to a level of screening material at its corresponding ridge's ridge bottom. Such ridge ends may have a generally bulbous shape, a rounded shape, or any desired curved shape. In certain aspects the screening material with the ridge-valley series of screening material has an outer perimeter and an outermost edge or end of each ridge end at the level of the screening material at the ridge bottom is within the perimeter of the screening material; i.e., the ridge end is not flush with or perpendicular to a plate edge or frame side. In certain aspects the present invention discloses a screen assembly for a vibratory separator or shale shaker, the screen assembly including a ridge-valley series of screening material with of a plurality of alternating ridges and valleys of screening material, each of said ridges having two spaced-apart ridge ends, and each ridge end comprising a seamless portion of screening material. In certain aspects the present invention discloses a screen assembly for a vibratory separator, the screen assembly with a ridge-valley series of screening material with of a plurality of alternating ridges and valleys of screening material, each ridge having two spaced-apart ridge ends, each ridge having two spaced-apart bottom edges in a bottom plane, and each ridge end with a portion of screening material at a non-perpendicular angle to the bottom plane. Any ridge disclosed herein may have only one non-flat ridge end (or only one of any other ridge end disclosed herein) and may have one ridge end like any known ridge end.

The present invention discloses, in certain embodiments, a screen for vibrating screen apparatus that has one or more upper layers of screen, screen cloth, and/or mesh. If more than one layer is used, they may be bonded together at discrete points, at discrete areas, or over all or substantially all of their entire surfaces. The layer or layers may be mounted on frame apparatus which may include a solid side support on each of two spaced apart sides of the layer(s), or may include a full four sided screen frame. A strap, strip or strips of support material (e.g. flat steel, aluminum or plastic strips of any width, with or without one or more humps or raised portions)—or rods of these materials are secured across two or more sides. With respect to a two sided frame wherein the two sides are parallel and spaced apart or a screen with two sides such as hookstrip sides, a strip or strips may be, according to this invention, disposed parallel to the two sides; and, if more than one strip is used, spaced apart across the area of the layer or layers. It is also within the scope of this invention to use a strip or strips which are disposed in a manner non-parallel to the two sides. Any such strip (or rod) may be bonded, sintered, welded or otherwise secured (herein referred to collectively as "bonded") at any point to the layer or layers; at substantially every point of contact between the strip(s) and the layer(s); or at selected intermediate contact points.

The present invention, in one embodiment includes a shale shaker with a frame; a "basket" or screen mounting apparatus; one or more screens as described above and below; and basket vibrating apparatus.

The present invention discloses a screen assembly for a vibratory separator or shale shaker, the screen assembly having at least one wire mesh screen formed with undulating mesh material having a series of ridges spaced apart by a series of valleys.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, nonobvious: screens and vibratory devices with such screens;

Certain embodiments of this invention are not limited to any particular individual feature disclosed here, but include combinations of them distinguished from the prior art in their structures and functions. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods.

The present invention recognizes and addresses the previously-mentioned problems and long-felt needs and provides a solution to those problems and a satisfactory meeting of those needs. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 2 is a perspective view of a system according to the present invention.

FIG. 3B is a schematic view of a system according to the present invention.

FIG. 6E is a perspective view of a screen apparatus according to the present invention.

FIG. 7A is a perspective view of a screen apparatus according to the present invention. FIG. 7B is an enlarged view of part of the screen apparatus of FIG. 7A. FIG. 7C is a view along line 7C—7C of FIG. 7A.

FIGS. 7D–7H show possible end shapes for ridge end covering according to the present invention.

FIG. 8A is a top view of a screen assembly according to the present invention. FIG. 8B is an exploded end view of the screen assembly of FIG. 8A. FIG. 8C is a cross-sectional view (exploded) of the screen assembly of FIG. 8A.

FIG. 9A is a top view of a screen component of the screen of FIG. 8A. FIG. 9B is an exploded view of the screen component of FIG. 9A. FIG. 9C is a side cross-section view of the screen component of FIG. 9A in corrugated form.

FIG. 10A is a side cross-section view of a screen component of the screen of FIG. 8A. FIG. 10B is a top view of the screen component of FIG. 10A. FIG. 10C is a top view of the screen component of FIG. 10B with notches. FIG. 10D is a side view of the screen component of FIG. 10A with formed ridge ends. FIG. 10F is a cross-section view of the screen component of FIG. 10D. FIG. 10E shows the profile from the side of one of the ridge ends of FIG. 10D. FIG. 10F shows the screen component of FIG. 10D prior to end formation. FIG. 10G is a side view of the screen component of FIG. 10F.

FIG. 13B is a top view of a screen component for a screen asembly according to the present invention, e.g. as in FIG. 8A. FIGS. 13C and 13D are cross-section (exploded) views of the screen component of FIG. 13B. FIG. 13A is a cross-section view showing the screen component of FIG. 13B in corrugated form. FIG. 13E is a top view showing the screen component of FIG. 13A with notches. FIG. 13F is a side view that shows the screen component of FIG. 13E with formed ridge ends. FIG. 13G is a side view of the screen component of FIG. 13F. FIG. 13H is a side view of the screen component of FIG. 13E showing ridge end profiles.

DESCRIPTION OF EMBODIMENTS PREFERRED AT THE TIME OF FILING FOR THIS PATENT

Figure 1A:
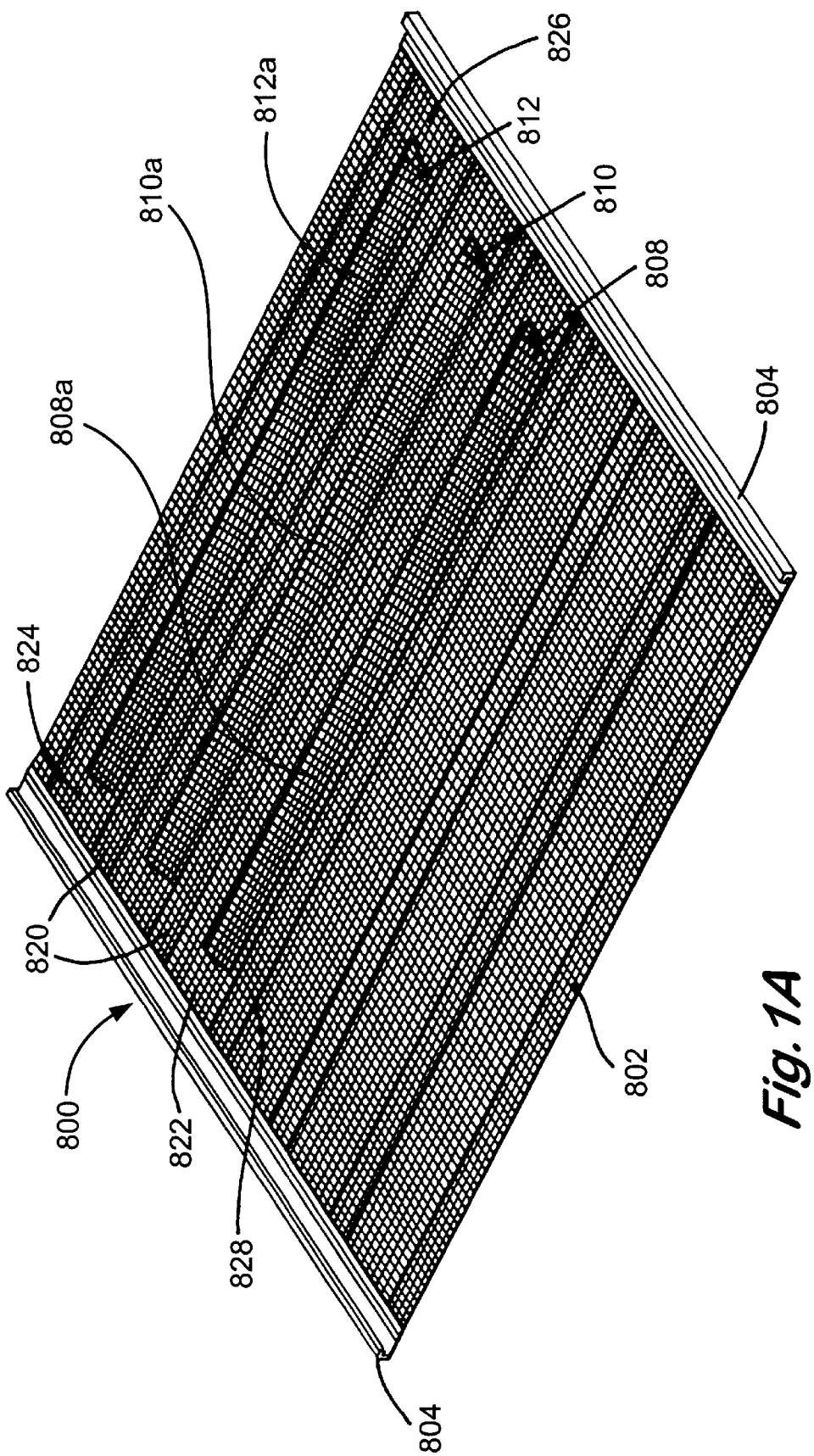
FIG. 1A is a perspective view of a screen according to the present invention.
Figure 1B:
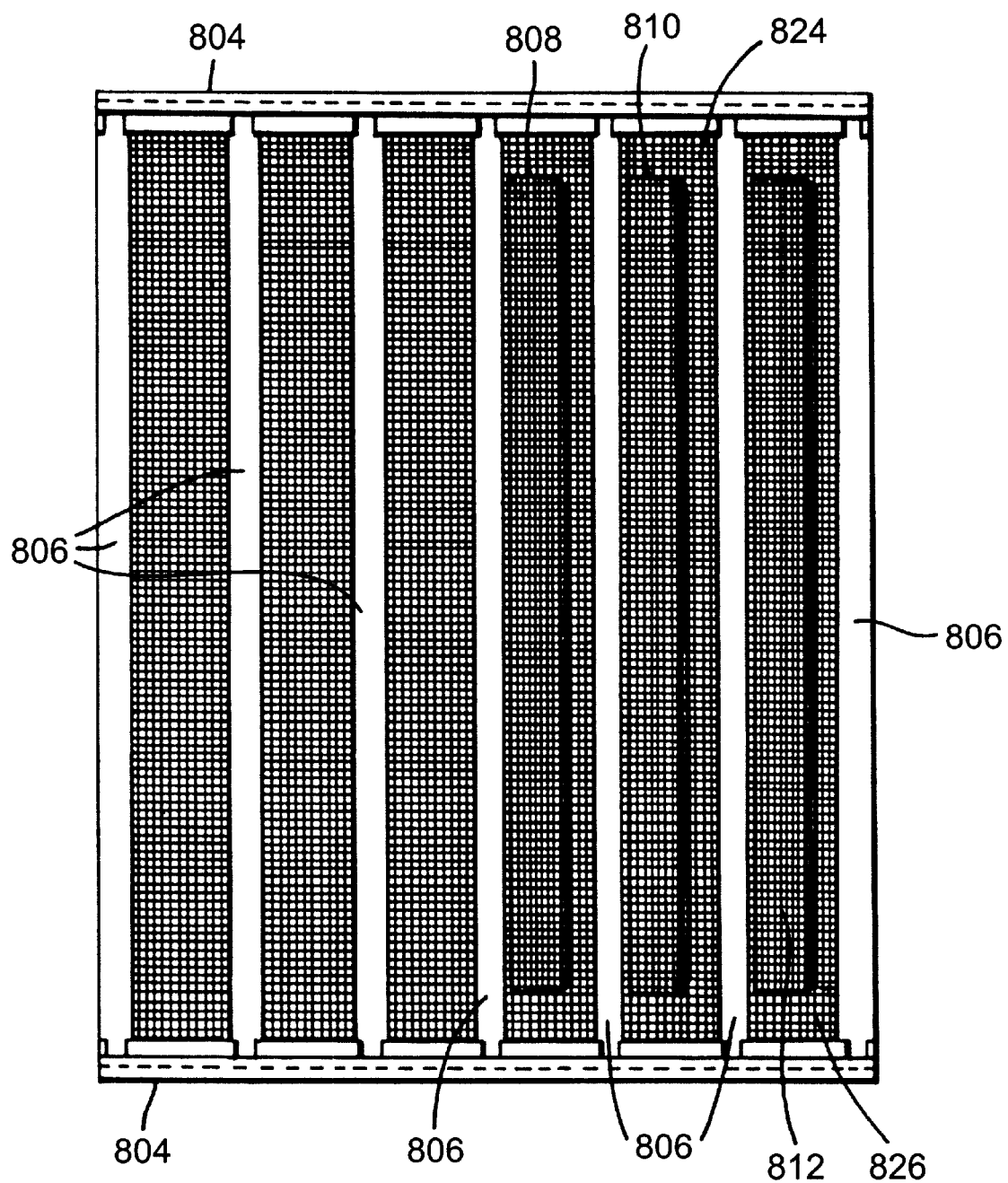
FIG. 1B is a bottom view, FIG. 1C a top view, FIG. 1D a side view, FIG. 1E a side view, and FIG. 1F an end view of the screen of FIG. 1A.

FIGS. 1A and 1B show a screen 800 according to the present invention with mesh 802 supported on spaced-apart straps 806. The mesh 802 may be any suitable known mesh, screen, meshes, screens, or combination thereof, secured together or lying on each other and/or partially bonded or sintered together, or so connected to each other over substantially all of their area. In the screen 800, the mesh 802 is, in one aspect, a wire mesh that is bonded to the straps 806.

The straps 806 are secured to hookstrips 804, e.g. as previously described for straps herein.

As shown, the screen 800 has three spaced-apart ramps 808, 810, 812. A dewatering area or pool 822 is defined between the two ramps 808, 810 and a dewatering area or pool 820 is defined between the two ramps 810, 812. Side flow paths 824, 826 are positioned between ends of the ramps 808, 810, 812 and the hookstrips 804.

Figure 1C:
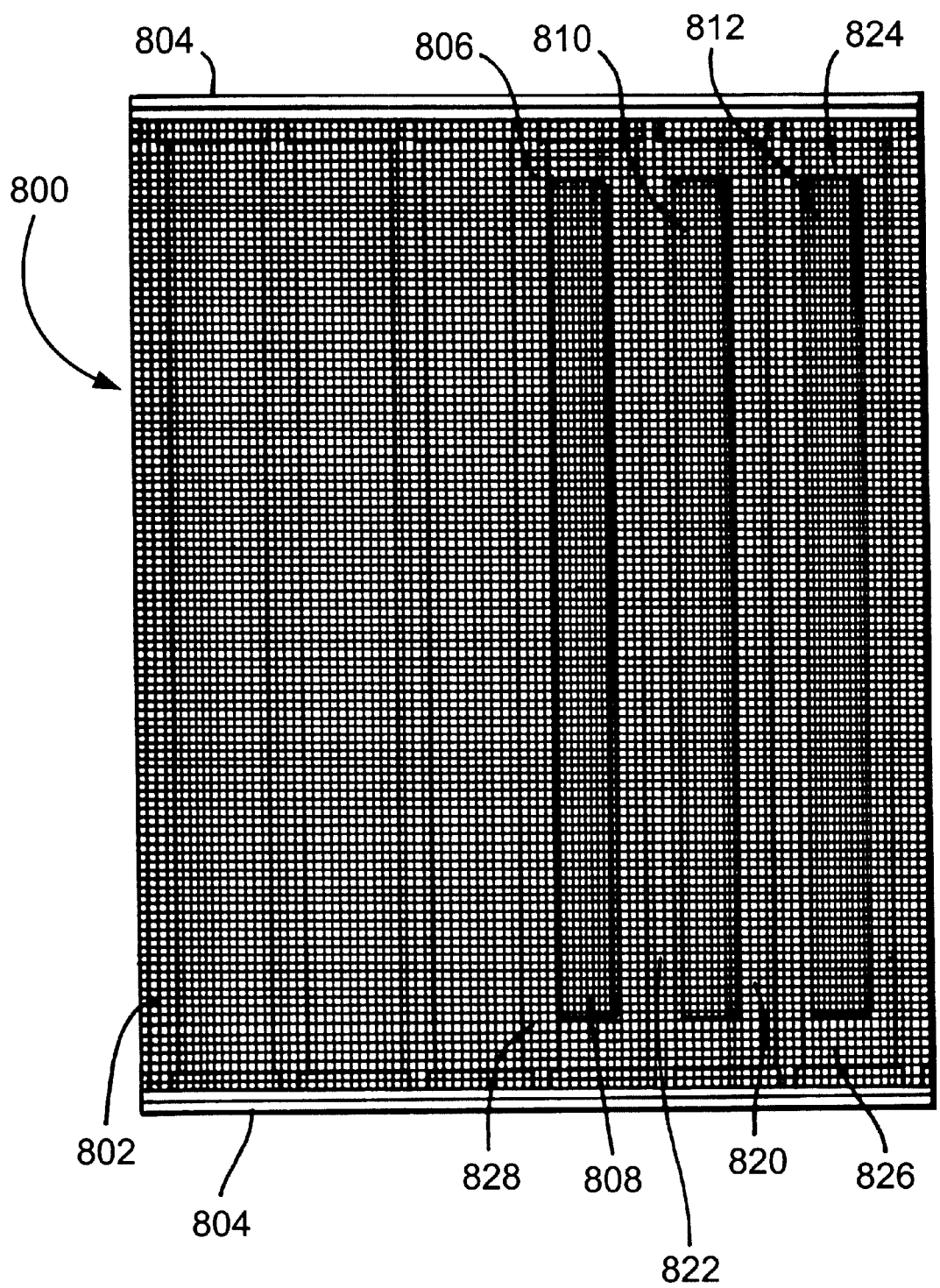

In one aspect the ramp 808 is located so that fluid material is introduced onto the screen 800 in an area behind (to the left in FIG. 1C) the ramp 808 and which includes one of the straps 806 therebeneath to counter effects of the impact of the fluid material on the wire mesh 802 in this area. Also such a location of the ramp 808 with respect to the strap 806 facilitates dewatering of solids in this area while inhibiting screen wear. Liquid rising to the top can exit through the screen ramp. Similarly a strap 806 traverses the areas 822 and 826.

Figure 1D:
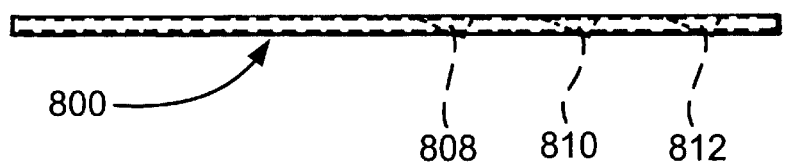
Figure 1E:
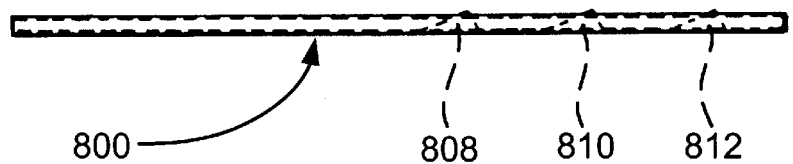
Figure 1F:
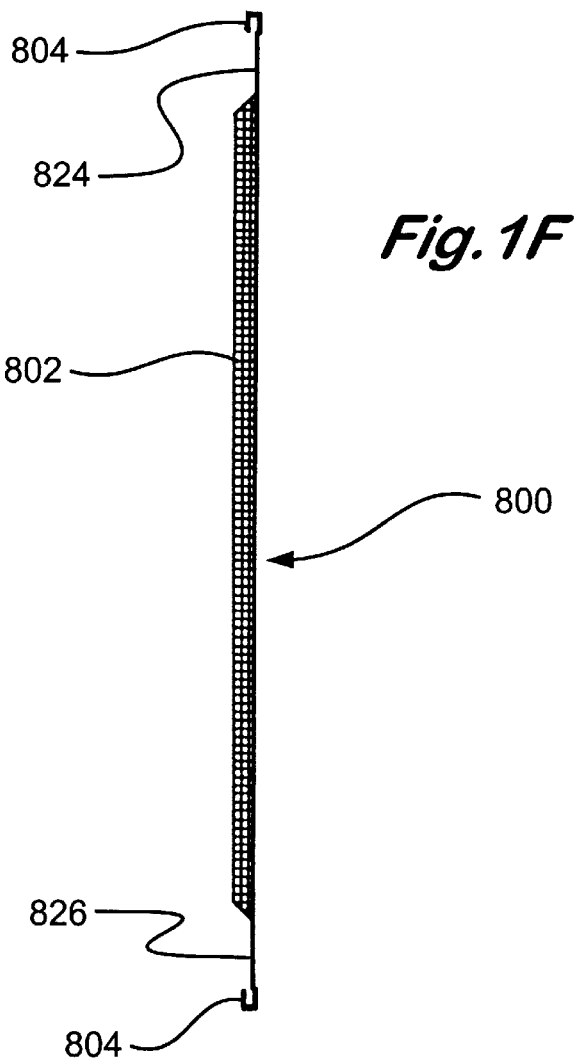

Alternatively, the ramp portions and straps may be positioned so that any or part of the ramp portions overlie a strap or a portion of a strap. The ramp portions may be spaced apart any desired distance. In one aspect the screen 800 is about 36 inches by 45½ inches; the right-hand edge (as viewed in FIG. 1C) of the ramp 808 is between about three to about five inches or more from the left-hand edge of the ramp 810; the right-hand edge of the ramp 810 is between about three to about five inches or more from the left-hand edge of the ramp 812; the right-hand edge of the ramp 812 is between about three to about five inches or more from the right edge of the screen 800; and the ramps are between about three to about five inches wide (horizontal dimension as viewed in FIG. 1E) and about ½ inch high (as in FIG. 1E). Each ramp 808, 810, 812 has a ramped surface 808a, 810a, 812a, respectively at an angle, preferably, between about twenty to about forty degrees from the horizontal, more preferably between about twenty-five to about thirty degrees, and in one particular aspect about twenty seven-degrees. Each ramp also has a rear face at between about eighty to about one hundred twenty-five degrees to the horizontal, more preferably between ninety and one hundred twenty degrees, and in one particular aspect about one hundred fifteen degrees.

Referring now to FIG. 2, a vibratory separator system 910 according to the present invention has a screen 920 (with screen or screening cloth or mesh as desired) according to the present invention mounted on vibratable screen mounting apparatus or "basket" 912. The screen 920 may be any screen disclosed herein or have any combination of any feature or features of any screen or screen part disclosed herein; and any such screen may be used with any appropriate shaker or screening apparatus. The basket 912 is mounted on springs 914 (only two shown; two as shown are on the opposite side) which are supported from a frame 916. The basket 912 is vibrated by a motor 922 and interconnected vibrating apparatus 918 which is mounted on the basket 912 for vibrating the basket and the screens. Elevator apparatus 928 provides for raising and lowering of the basket end. The screen 920 may be any screen disclosed herein. As shown the screen 920 is like the screen 800 of FIG. 1D. Any ramp disclosed herein may have a curved or undulating shape as viewed from above instead of a straight shape. One or more ramps and/or divided ramps as described above may be used on any screen disclosed herein having one or more screens formed with an undulating shape.

Figure 4A:
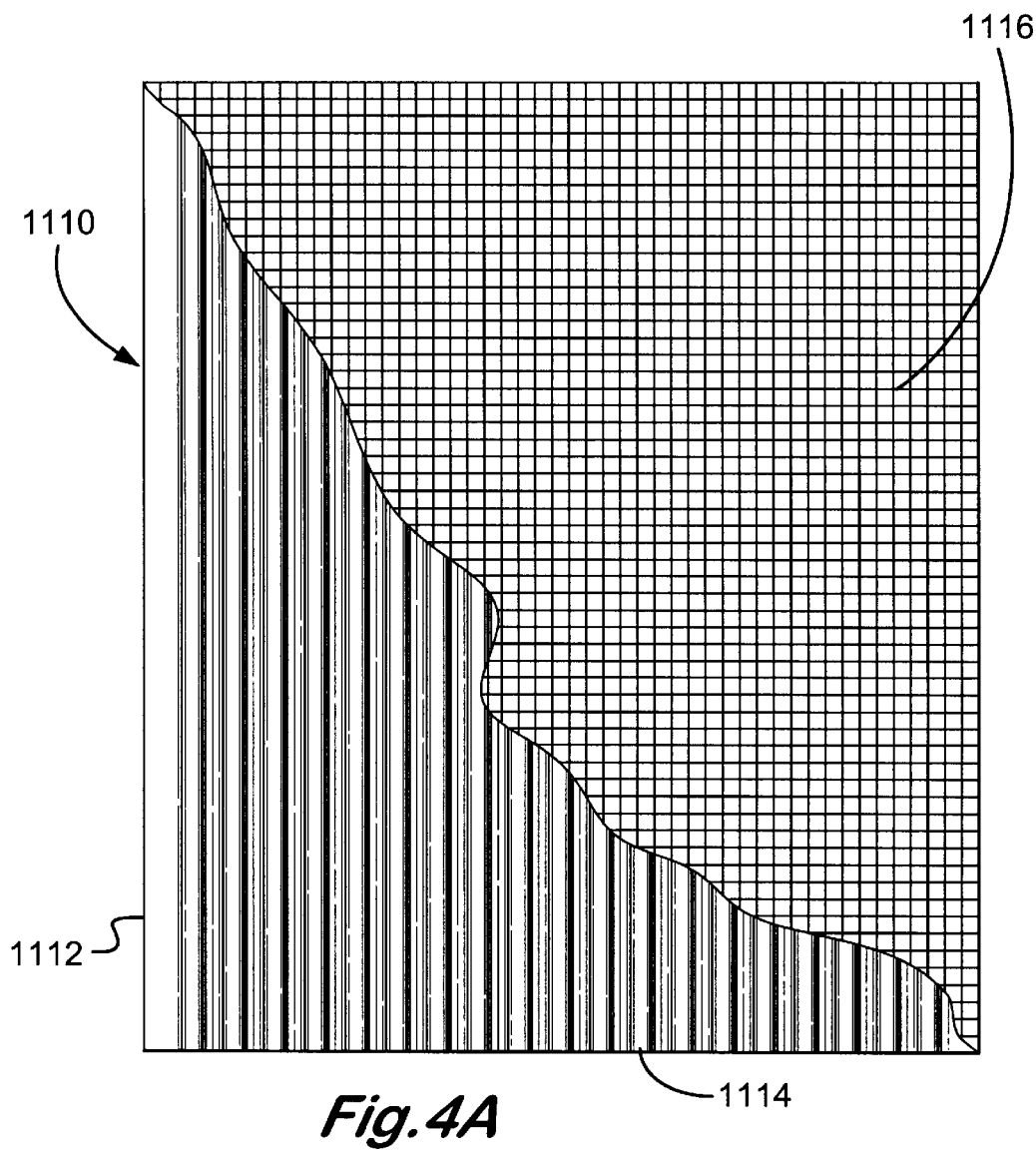
FIG. 4A is a top view partially cut-away of a screen according to the present invention.

FIG. 4A shows a screen 1110 according to the present invention with a lower base, support or frame 1112, three undulating mesh screens 1114 on and/or bonded to the frame 1112, and an upper mesh or screen 1116. The screens 1114 may themselves be bonded together, e.g. with epoxy, welding, and/or sintering. Rubber strips, plastic strips tape, cushion or cushions 1118 are positioned between the screen 1114 and the upper screen 1116. The strip(s) or cushion(s) 1118 are optional. As shown the strip(s), tape(s), or cushion (s) 1118 are secured to the screen 1114 (or to crests thereof), but it is within the scope of this invention to secure them (or some of them) to the screen 1116. To effect such securement any suitable glue, epoxy, weld, and/or sintering may be employed. The frame 1112 may be any suitable known base, frame or support.

Figure 4B:
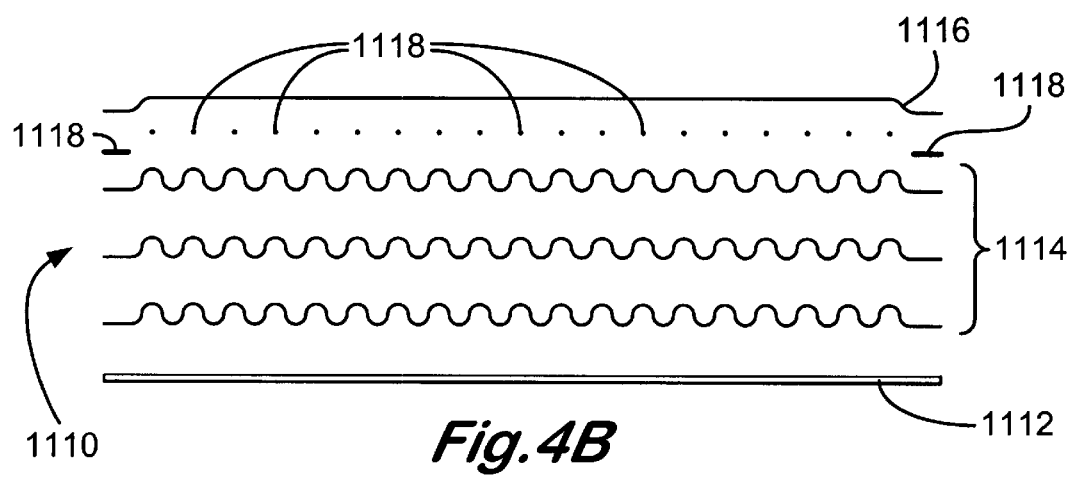
FIG. 4B is an exploded view of the screen of FIG. 4C.
Figure 4C:
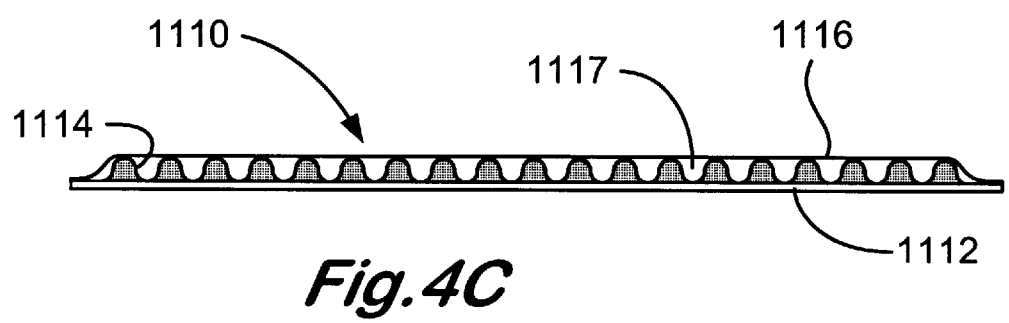
FIG. 4C is an end view of the screen of FIG. 4A.

It is within the scope of this invention for the screen 1114 to be any known screen, mesh, screens, meshes, or combination thereof, bonded together, unbonded, or bonded at only certain locations and with any known shape as viewed either from above or on end (as in FIG. 4A). It is within the scope of this invention for the upper screen 1116 to be any known screen, mesh, screens, meshes, or combination thereof, bonded together or unbonded, and with any known shape. As shown in FIG. 4B, the screen 1114 is three mesh screens bonded together with coarser mesh on the bottom, medium mesh in the middle, and finer mesh on top. The screen 1116 as shown may be a scalping screen of a mesh coarser than the finest mesh of the screen 1114 or of a multi-layer coarser mesh. In another aspect the screen 1114 is a single screen of closely woven mesh made of any suitable material, e.g. stainless steel and/or plastic material and the screen 1116 is a single screen of coarser mesh made of any suitable material (e.g. but not limited to stainless steel and/or plastic), with the screen 1114 on a metal or plastic frame or support. Alternatively or additionally, instead of the frame 1112 any known perforated plate, strip, or series of straps or strips may be used. A series of straps or strips is not legally equivalent to a perforated plate.

In one aspect the strips 1118 are fused plastic strips aligned with peaks of the undulating fine mesh. Such strips may be made of rubber (e.g. nitrile) or plastic, e.g. polypropylene, to inhibit or prevent abrasion of the finer meshes. Such strips can be glued to the bottom of the screen 1116 and/or the screen 1114. Also the screen 1116 can be glued to the screen 1114.

Figure 4D:
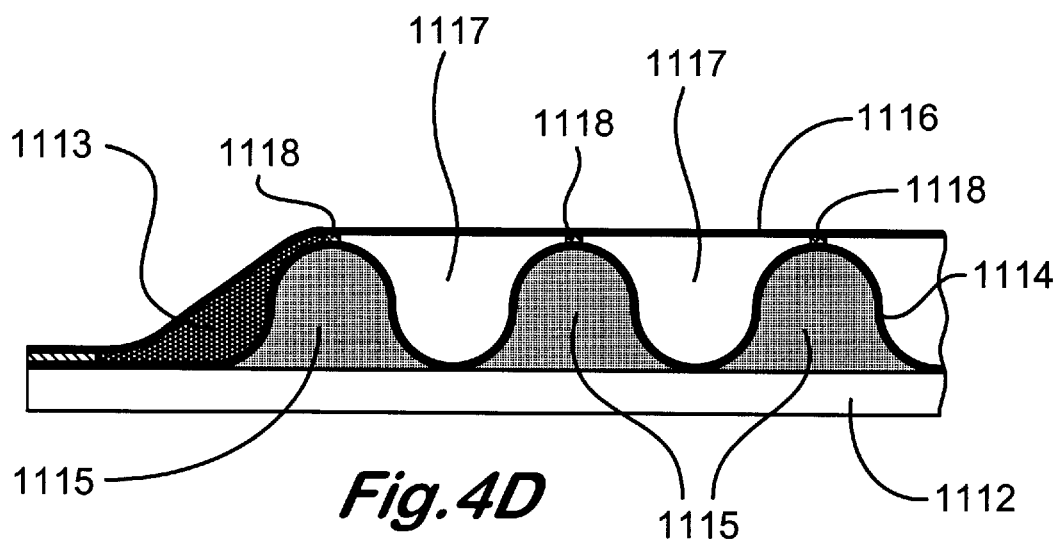
FIG. 4D is an enlargement of part of the screen of FIG. 4C.

End plugs 1113 and 1115 (FIG. 4D) sealingly close off open ends of the screen 1110. These end plugs may be made of rubber, metal, wood, plastic, Teflon™ material, or urethane. The plugs 1113 extend along two sides of the screen along crests of the screening material to completely seal the sides. The plugs are held in place by friction fit, glue, epoxy, welding and/or sintering. Alternatively, the ends may be covered with screen material.

Fluid flow on the screen 1110 from either end may be from top-to-bottom as viewed in FIG. 4A, bottom-to-top, or from one side to the other.

In one aspect the screen 1116 is a scalping screen of woven steel mesh. In another aspect, it is woven plastic or synthetic or composite mesh; and in another aspect it is a combination of woven steel and woven plastic or synthetic or composite mesh. The screen 1116 may be the same mesh or coarser mesh than that of the screen 1114 or of any layer thereof.

In this embodiment the areas 1117 between the screen 1116 and the screen 1114 are open. The screen 1116 protects the mesh of the screen 1114 from abrasive particles. When the screen 1116 is of a coarser mesh than that of the screen 1114, relatively larger particles retained on the screen 1116 are prevented from damaging and/or hindering flow through the screen 1114.

With the screen 1110 as shown liquid flow through the screen is increased by reducing the thickness of the solids bed of the finer mesh screens by the separation of larger particles with the screen 1116.

Use of the upper screen 1116 increases stability and rigidity of the screen 1110, improving solids conveyance across and off, rather than through the screen 1116 thereby facilitating liquid flow through the screen. Solids that do not flow through the screen 1116 do not encounter the lower finer mesh screens and do not reduce flow through the finer mesh screens. Use of the upper screen 1116 also reduces the initial impact load of flow onto the screen 1114 at a feed entrance to the screen, thereby extending screen life.

Figure 5:
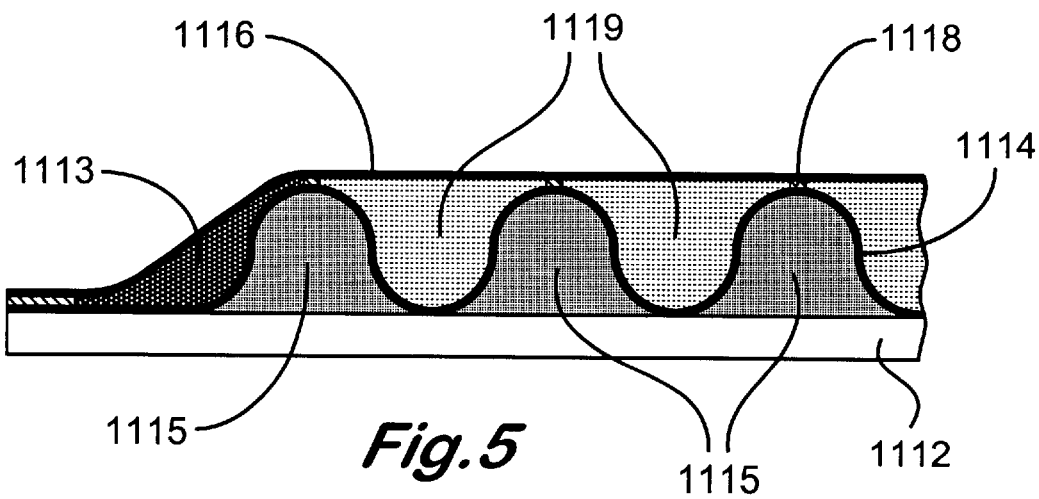
FIG. 5 is an end view in cross section of an alternative embodiment of the screen of FIG. 4A.

FIG. 5 shows an alternative embodiment of the screen 1110 with identical parts (indicated by the same numerals) but with additional end plugs 1119 between the upper screen 1116 and the screen 1114. Such "double plugging" may be used on either or both screen ends. A fluid and/or particles introduced to the screen 1110 first encounters the screen 1116 and then material flowing through the screen 1116 flows to the screen 1114. The plugs 1119 may be made of the materials described for the plugs 1113, 111 5 and the plugs 1119 may be similarly installed and/or secured in place. Any of the plugs 1113, 1115, 1119 may be deleted in certain embodiments.

Figure 3A:
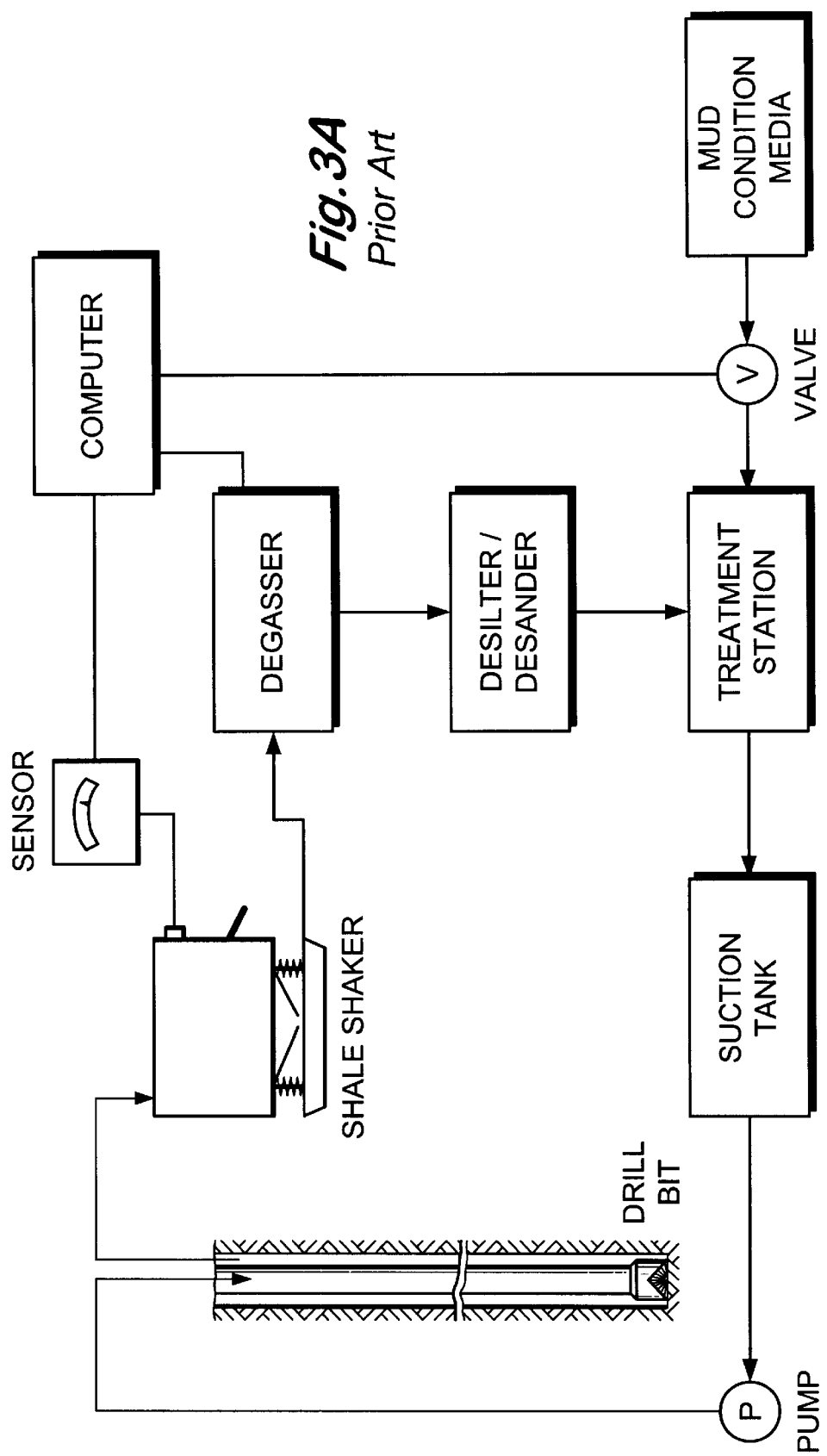
FIG. 3A is a schematic view of a prior art system.

FIG. 3A discloses one example of a typical prior art shaker system (e.g. as shown in U.S. Pat. No. 5,190,645). FIG. 3B shows a system 1200 according to the present invention with parts like those of the system of FIG. 3A; but with a shale shaker K having a screen or screens S according to the present invention (any screen or screens disclosed herein). The screen(s) S are mounted in a typical shaker basket B and one or more vibrators V (any known suitable shaker vibrator) vibrate the basket B and hence the screen(s) S.

Figure 6A:
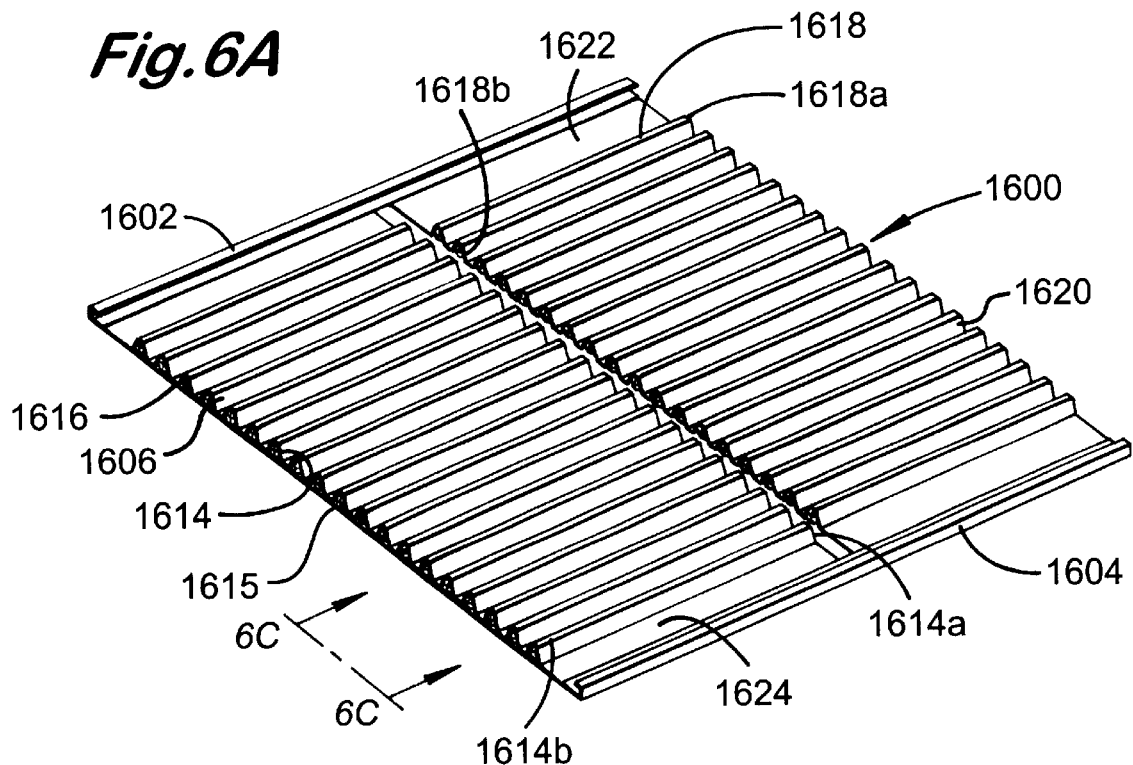
FIG. 6A is a perspective view of a screen apparatus according to the present invention.
Figure 6B:
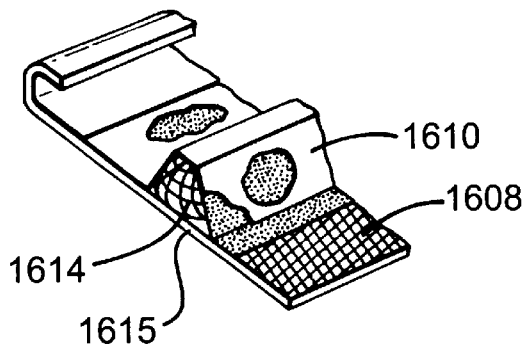
FIG. 6B is an enlarged view of part of the screen apparatus of FIG. 6A.
Figure 6C:
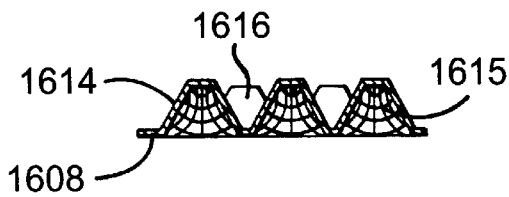
FIG. 6C is a view along line 6C—6C of FIG. 6A.

FIGS. 6A–6C show a screen 1600 according to the present invention useful, e.g. in a vibratory shaker, shale shaker, and/or the apparatus of FIG. 33, which has hook strips 1602 and 1604 on either side thereof. Screening material 1606 is connected along the length of each hook strip by known methods, e.g. folding, welding, crimping together, epoxying, press/fiction fit, and/or interlocking of parts. In one aspect no underlying plate, straps, or strips and no frame are used with the screen 1600.

The screening material 1606 may be any known screening material, screen and/or mesh or combination thereof and/or any screening material disclosed herein. In the screen 1600 as shown, the screening material 1606 includes a lower mesh (e.g. 1 to 80 mesh) 1608 which may be a relatively coarse mesh and an upper mesh 1610 (e.g. 8 to 400 mesh) and which may be a relatively fine mesh. Two fine mesh screens and one coarse mesh screen may also be used. The fine screen may be bonded to the coarse mesh, sewed to the coarse mesh, glued to it, welded to it, and/or sintered to it.

An optional perforated plate or a series of straps or strips may be used below the coarse mesh, including, but not limited to, any as disclosed herein. One, two, three or more layers of wire mesh may be used instead of or with such a plate, straps, or strips. In one particular aspect a flat coarse mesh (e.g. mesh 1 to mesh 12) is used instead of or in addition to a plate, straps, or strips.

Mesh (fine, coarse, or both) is folded over open exposed ends of ridges 1614 and 1618. This mesh can be substantially flat over the open ridge end or, as shown, it can protrude as part of a bulb or closed curve shape 1615. Such shape can provide more screen area for separation and can deflect and re-route solids and fluid to a subsequent set of valleys. Alternatively any or all openings may be plugged with a solid, porous, or perforated plug glued or welded in place. Alternatively, instead of folding screening material and/or mesh over the ends of ridges, a separate piece of screen, screens, mesh, and/or meshes can be placed at an open ridge end and the edges of the piece attached to, connected to, interlocked with, interwoven with, and/or adhered to the edges of the ridge end opening. Also, it is within the scope of this invention for any ridge end to be closed off to fluid flow, to be covered with screen(s) and/or mesh, and/or to be plugged. It is within the scope of this invention for all ridge ends on one side of a series of ridges (e.g. on side 1618a or 1614a) to be closed off to flow while the other side's ridge ends (e.g. on side 1618b or 1614b) are covered with material which permits flow [e.g. perforated plug, screen(s), mesh(es)]. These possibilities for end closure and end openings may be used with any screen assembly disclosed herein. It is also within the scope of this invention for all ridge ends of all ridge sets to be open.

Figure 6D:
FIG. 6D is a view of another version of the screen of FIG. 6A looking at it as in FIG. 6C.

A series of valleys or troughs 1616 is interspersed between the series of ridges 1614. A second series of ridges 1618 and valleys 1620 is offset from the ridges 1614/valleys 1616, as shown in FIGS. 6A–6D. Alternatively, as shown in FIG. 6D the shape of one set of ridges RD can overlap (when viewed on end) the ridges RG of the other set of ridges. It is within the scope of this invention to employ any desired amount of such overlap. As shown, e.g. in FIGS. 6C and 6D, the ridges are of substantially the same height and ridge ends are of substantially the same cross-sectional area. It is also within the scope of this invention for the ridges of one set of ridges to be of a different width than those of the other set; for the one set to be wider or narrower than the second set; for ridges or ridge ends on one set to have a different cross-sectional area than those of another set; and/or to employ three, four, five, six or more series of offset ridges on a single screen. Optional side paths 1622 and 1624 may be eliminated by having a ridge edge or ridge adjacent a hook strip side or positioned against a frame side (when an optional frame is used) or side member if hook strips are not used.

FIG. 6E presents a screen apparatus 1630 with four sets of offset ridges 1631, 1632, 1633, 1634 and hook strip sides 1635, 1636.

FIGS. 7A–7C show a screen apparatus 1640, e.g. useful with a vibratory shaker, shale shaker and/or apparatus as in FIG. 33, with a series of ridges 1641 and valleys 1642 of screening material 1643 (like any of the screening material 1606, FIG. 6A). Ends of ridges are, optionally, covered with screen and/or mesh (or, alternatively, plugged as described above with either solid or perforated plugs) in a closed curved shape or bulbous shape 1644 or they may be flat. The screening material 1643 extends between side hook strips 1645, 1646. As shown in FIG. 7C, ridges of the set of ridges 1641 may have different heights; e.g. alternating high and low, high in the middle and lower on the ends, or as shown in FIG. 7C higher on the ends and lower in the middle. Any such series of ridges with height differences, with width differences, and, therefore, with differing cross-sectional area and different amount of surface area may be used for any ridge series or part thereof on any screen disclosed herein. As shown in FIG. 7C, the height (and also the cross-sectional area as viewed on end as in FIG. 7C) of the ridges may gradually decrease from the sides of the screen assembly to the middle. Alternatively, the height (and cross-sectional area) may increase from the screen sides to the screen middle.

FIGS. 7D–7H show possible shapes for ridge end coverings for the ends 1644 (and for any ridge end disclosed herein). The coverings are designated CV-55D, CV-55E, CV-55F, CV-55G and CV-55H for FIGS. 7D–7H, respectively.

FIGS. 8A–8C illustrate a screen assembly 10 according to the present invention which has two rows 12, 14 of corrugated screening material, each row including an undulating series of alternating ridges 13 and valleys 15; formed ridge ends 16 at the ends of each ridge; mesh strips 17, 18, 19 between the rows 12, 14; and an optional mesh layer 11 beneath the strips 17–19. Alternatively a supporting layer of woven mill cloth may be used as support backing (which is not the legal equivalent of a perforated plate or frame).

The ridge ends 16 may be formed in any suitable manner, including, but not limited to: by pushing out a portion of the screening material in the desired non-flat shape, e.g. by hand or with a suitably shaped curved or rounded tool e.g., but not limited to a curved or rounded tool; with an apparatus or jig having one or a plurality of tools, shafts, plates, or bars (which may, in at least certain aspects, have curved or rounded portions) which are forced against the screening material (or against which the screening material is forced); or by a similar apparatus with a plurality of tools, etc. that forms the entire ridge with the non-flat ridge ends in one or more impressions on the screening material. Ridge ends may also be formed by die stamping screening material. In one aspect laser perforated material, e.g. between 13 to 34 gauge thick may be used and/or commercially available material between 0.20 mm to 2.00 mm thick with minimum hole widths from 40 to 18 microns e.g. as available from Action-Laser Pty. Ltd. of Australia. Alternatively or in addition to any of these methods: notches and/or slits are made in the screening material to facilitate ridge end formation; separate pieces of screening material are used to form a ridge end portion which is then connected to the ridge/valley portions of screening material; and/or additional and/or different mesh and/or screening material is added to the ridge/valley screening material at points of stress, curving, or bending and/or at the area of ridge end formation.

In one aspect as shown in FIGS. 8A–8C hookstrip sides 21 are secured on two sides of the screening material of the screen assembly 10. Any known hook or hookstrip mounting structure may be used. Alternatively a four-sided frame and/or a series of lower support strips or straps may be used or a support layer of mesh or mill cloth may be used.

FIGS. 9A–9C show one particular embodiment according to the present invention for the row 12 of corrugated screening material. It is to be understood that it is within the scope of this invention for the rows 12, 14 to be made of any screening material and/or mesh, including, but not limited to, any disclosed herein and for their to be one, two, three, four or more rows like the row 12 or the row 14 in any combination, with multiple layers of material bonded together or not.

FIG. 9B is an exploded view of the row 12 prior to corrugation (shown in FIG. 9C). A support mesh 22 (e.g. 6 mesh to 1 mesh) is adhered, taped or glued to (e.g. with material 23 glue, plastic, adhesive or tape) and beneath a middle layer 24 of material (e.g. synthetic or wire mesh of 30 mesh to 300 mesh or screening material. A top wire or synthetic mesh layer 26 (e.g. 50 mesh to 500 mesh) rests on (and is, optionally, adhered to, welded to, or spot welded to the middle layer 24).

FIGS. 10A–10G illustrate one method and structure for forming the non-flat ridge ends 16 of the screen assembly 10. A layer of wire 31 (e.g. 30 to 500) or synthetic mesh is placed on a lower support layer 32 (e.g. of wire mesh 12 mesh to 50 mesh or of synthetic mesh) and the two are connected together with a strip 33 of glue adhesive or plastic in any suitable known manner, including, but not limited to, by gluing, welding, plastic or plastic grid heating fusing, taping, or with any suitable adhesive (as can be done to connect together any two layers of any structure or screen disclosed herein). A resulting laminated screen section 34 has notches 35 cut out of it to facilitate ridge end formation. FIG. 10D shows the ridge ends 16 formed on the section 34. Their number, shape and configuration correspond, e.g. to the ridges 13 and valleys 15 of the corrugated row 12 of the screen 10 (FIG. 8A). The section 34 is then connected to the corrugated screen material so that a non-flat ridge end coincides with and corresponds to each ridge end. FIG. 10G is a side view of the component of FIG. 10F prior to end formation.

As shown in FIG. 10E, the non-flat ridge ends 16 taper from a level of a top of a ridge 13 down to a bottom level of the row 12 (and a bottom level of the section 34. Also, in one aspect as shown, the entire ridge end 16 is above and within (to the right of in FIG. 10E) the perimeter of the resulting screen's screening material. This in-the-perimeter disposition of the ridge ends is also illustrated in FIG. 8A. Alternatively, the ridge ends may project beyond this perimeter.

Figure 11A:
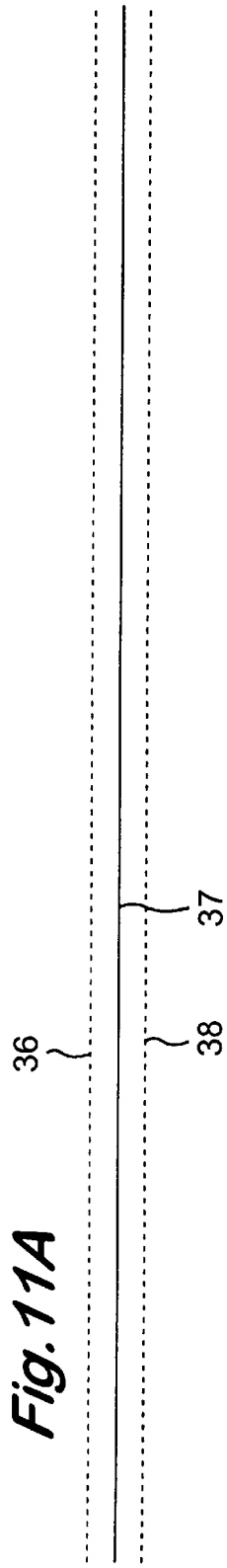
FIG. 11A is a cross-section view (exploded) of a screen component of the screen asembly according to the present invention, e.g. as in FIG. 8A.
Figure 11B:
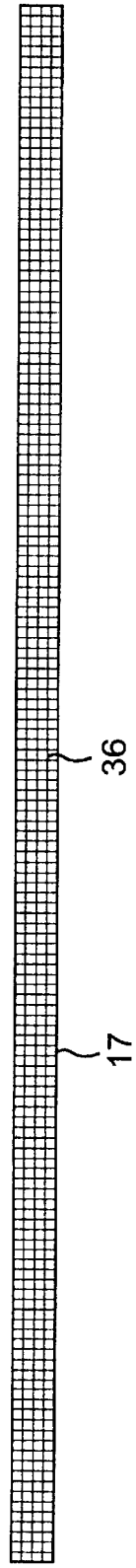
FIGS. 11B and 11C are top views of screen components according to the present invention with layers as shown in FIG. 11A.
Figure 11C:
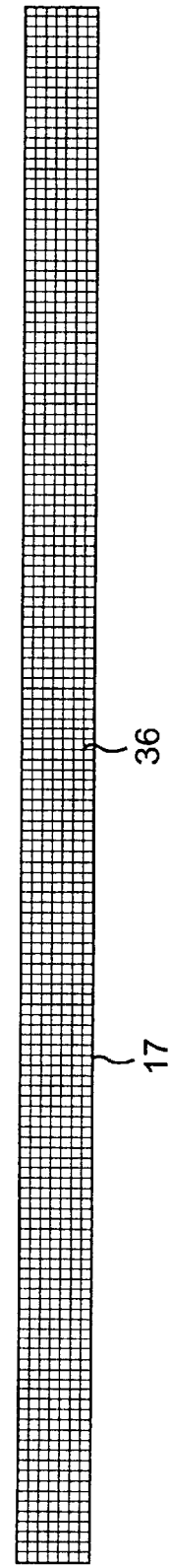

FIG. 11A illustrates one embodiment of the strips 17–19. A wire mesh (30 mesh to 50 mesh) or synthetic mesh layer 36 is connected to a support mesh layer 37 (e.g. 12 mesh to 50 mesh) e.g. by glue 38 (plastic, or adhesive tape, etc.).

Figure 12:
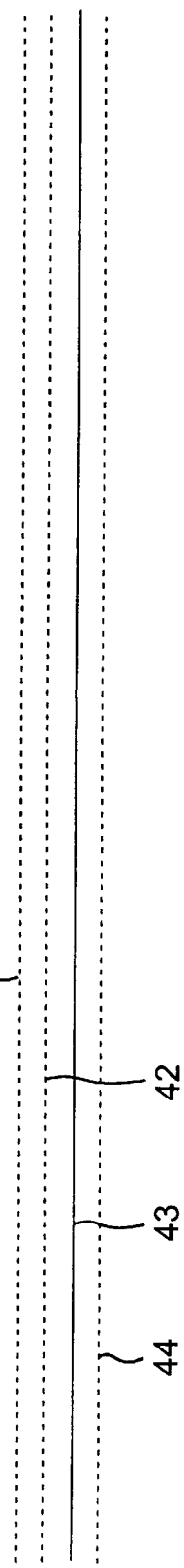
FIG. 12 is a cross-section view (exploded) of a screen component for the screen assembly of FIG. 8A.

FIG. 12 illustrates an alternative layer structure (e.g. but not limited to for the rows 12, 14) that includes a top layer 41 of wire mesh or synthetic mesh (30 mesh to 500 mesh; ("synthetic" includes, but is not limited to plastic, Nylon, polypropylene, urethane and polyethylene); a middle layer 42 of relatively fine mesh (30 mesh to 300 mesh); connection layer 43 (glue, etc.); and a lower support layer 44 e.g. of 12 mesh to 50 mesh. A connection layer 43 (and any glue layer herein) may be a grid or pattern of glue, plastic, etc. in any desired pattern or configuration.

FIGS. 13A–13D illustrate an embodiment for producing rows 12, 14 for the screen 10 (FIG. 8A). It is to be understood that in a screen according to the present invention the row 14 (or the row 12 or any now disclosed herein) can be eliminated and the row 12 (or any now disclosed herein) enlarged to cover substantially all of the area of the screen assembly. A laminated screen section 50 has a support layer 51 of two strips 56, 57 (e.g. 12 mesh to 30 mesh) on a wire or synthetic mesh layer 52 (e.g. 30 mesh to 500 mesh) on a wire or synthetic mesh layer 53 (e.g. 30 mesh to 300 mesh) connected by a (e.g. with a glue, etc.) layer 54 to a support mesh layer 55 (e.g. 12 mesh to 50 mesh).

As shown in FIGS. 13B and 13D the support mesh 51 includes two spaced-apart strips 56, 57 (for illustration purposes the strips 56, 57 are not shown with cross-hatching) which do not extend across the entire screen section. Portions "b" and "c" (corresponding to strips 56, 57 include only the top mesh 51 and the middle layer 53. Portion "a" includes the layers 52–55 and not layer 51.

FIG. 13E shows the mesh in FIG. 13B, but with notches. FIG. 13E illustrates a screen section 60 (e.g. like the section 50, FIG. 13B). Notches 61 have been cut in strips 66, 67 (like the strips 56, 57, FIG. 13B. Strips of glue 63 (like the glue strip 33, FIG. 10B) extend along two sides of the section 60 to attach the strips to layers 52–55. The ridge ends (e.g. items 16, FIG. 8C) are formed of the strips 56, 57. As shown in FIGS. 13F and 13H, non-flat ridge ends 66 (like the ridge ends 16) are formed on the sides of the section 60. FIG. 13G shows the screen of FIG. 13E with material corrugated and ridge ends not yet formed.

Figure 14A:
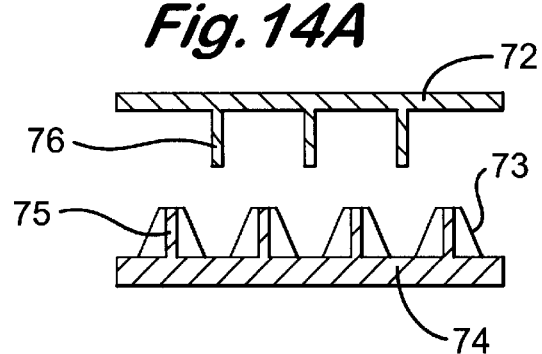
FIG. 14A is a cross-section view of an end forming fixture.
Figure 14B:
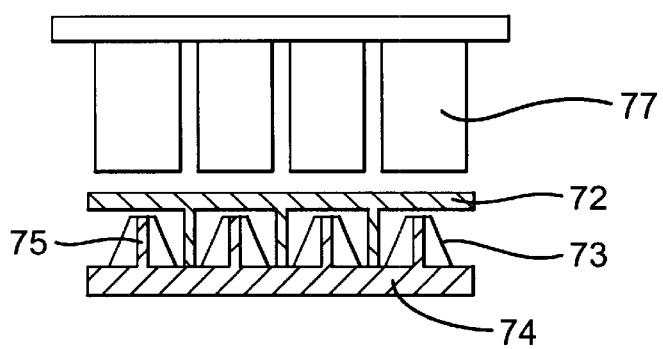
FIG. 14B is a cross-section view of the fixture of FIG. 14A.
Figure 14C:
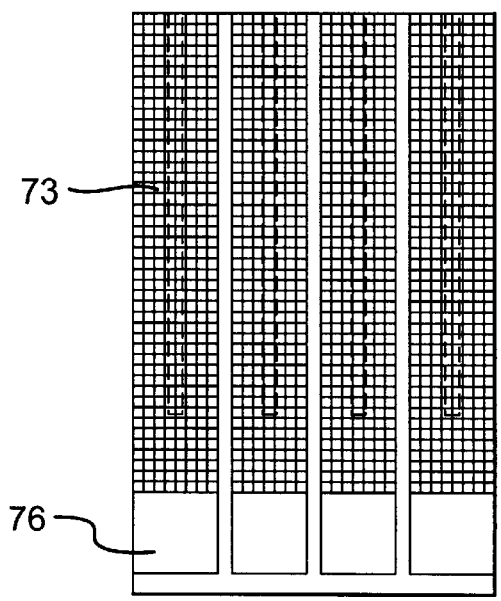
FIG. 14C is a top view of the fixture of FIG. 14A.
Figure 14D:
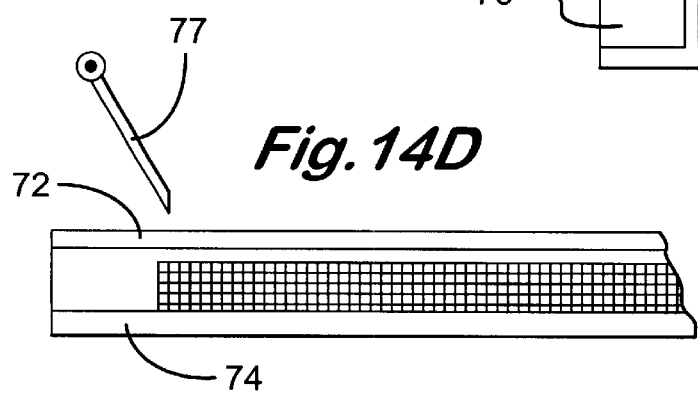
FIG. 14D is a side view of the fixture of FIG. 14B.

FIGS. 14A–14C show an end forming jig 70 with a top fixture 72 movable to co-act with a bottom fixture 74. As shown in FIG. 14B the top fixture 72 has moved down with respect to the bottom fixture 74. Corrugated screening material 73 with ends sticking out is positioned on the bottom fixture 74 over a plurality of spaced-apart bars 75. Bars 76 of the top fixture 72 move down to contact troughs or valleys of the screening material 73 to form the non-flat ridge ends. Members 77 connected to a guide bar 78 are movable downwardly to form the ridge ends. The bars 76 are shown in outline in FIG. 14C. Bar 72 holds the bars 76 in place. Such a jig may be used either to form end pieces that are later connected to a piece of screening material or an entire piece of screening material may be positioned adjacent the jig to form ends in a portion of the entire piece. Any composite multi-layer piece of screening material described herein may be used.

Figure 15A:
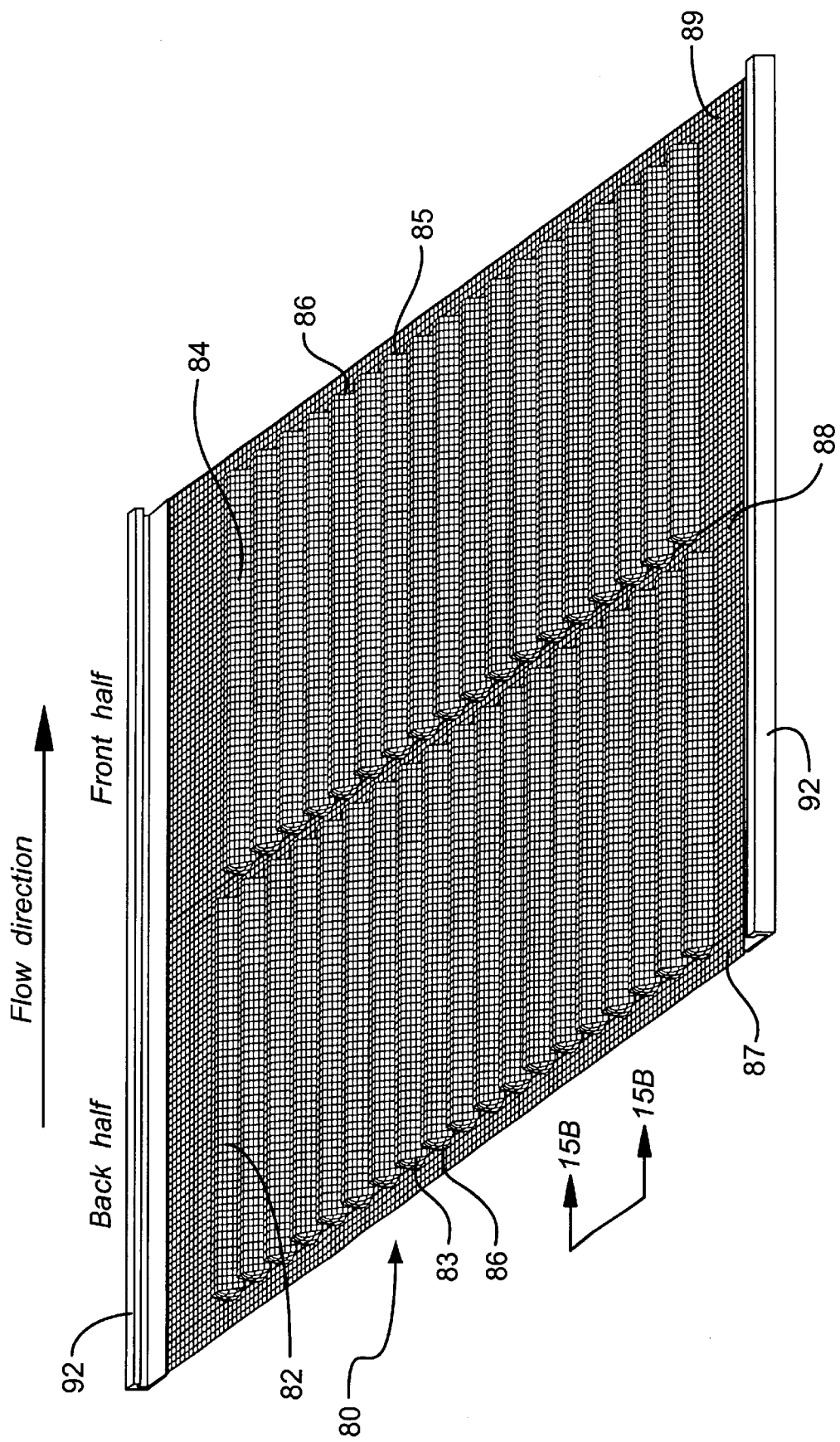
FIG. 15A is a perspective view of a screen assembly according to the present invention.
Figure 15B:
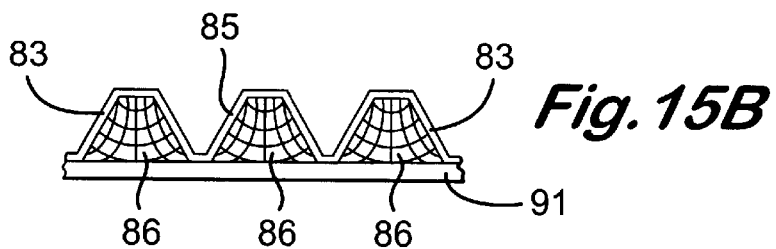
FIG. 15B is a partial end view of the screen assembly of FIG. 15A.
Figure 15C:
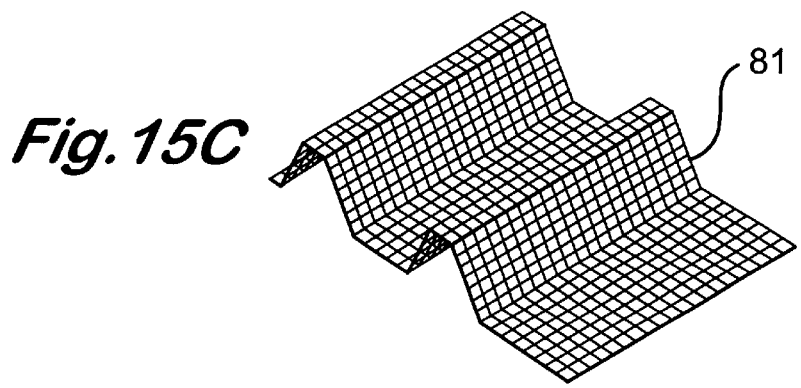
FIGS. 15C–15F are perspective views of parts of the screen assembly of FIG. 15A.

FIGS. 15A–15F show a screen assembly 80 according to the present invention and parts thereof. The screen assembly 80 has two rows 82, 84 of corrugated screening material (like rows 12, 14, FIG. 8A or like any rows or corrugated screening material herein). Strips 87, 88, 89 are like strips 17, 18, and 19 of the screen assembly 10, FIG. 8A. Alternatively the strip 88 may be omitted. Ridge ends 86 of ridges 83, 85 are like ridge ends 16, FIG. 8A (or any other ridge ends disclosed herein). The strips 87–89 are on a support mesh layer (or woven mill cloth) 91. FIG. 15C shows a portion 81 of one of the rows 82, 84. Hookstrips 92 are along two sides of the screen assembly 80. In one aspect, fluid to be treated, e.g. drilling fluid with mud solids entrained therein, flows first to the row 82 and then to the row 84 (left to right in FIG. 15A). In other aspects this direction may be reversed.

Figure 15D:
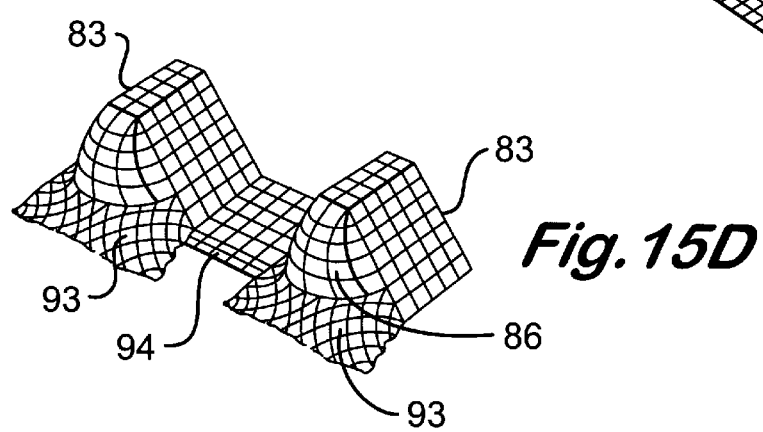
Figure 15E:
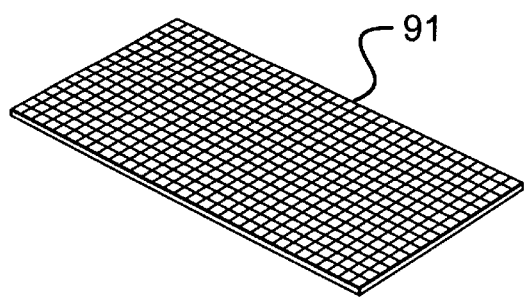
Figure 15F:
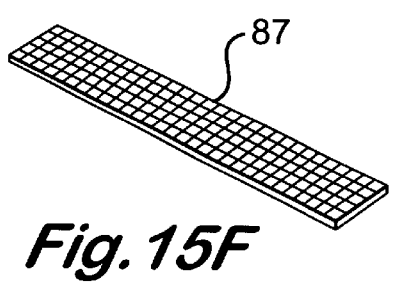

FIG. 15D shows steps in one method for forming the ridge ends 86. Notches 93 and optional notches 94 are made in the screening material to facilitate formation of the ridge ends.

The present invention, therefore, provides in certain, but not necessarily all embodiments, a screen assembly for a vibratory separator, the screen assembly having a ridge-valley series of undulating screening material [screen(s), mesh(es) cloth(s), etc.] comprised of a plurality of alternating ridges and valleys of screening material, each of said ridges having two spaced-apart ridge ends, a ridge top and a ridge bottom, and each ridge end comprising a portion of screening material that tapers down from its corresponding ridge's ridge top to a level of screening material at its corresponding ridge's ridge bottom. Such a method may include one or some of the following, in any possible combination: wherein said ridge ends are of a generally bulbous shape; and/or wherein the screening material with the ridge-valley series of undulating screening material has an outer perimeter and wherein an outermost edge of each ridge end at the level of the screening material at the ridge bottom is within the perimeter of the screening material.

The present invention, therefore, provides in certain, but not necessarily all embodiments, a method for treating fluid (e.g. fluid with solids therein or drilling fluid with entrained particulates) with a vibratory separator (e.g. a shale shaker), the fluid having material therein to be separated therefrom, the method including introducing the fluid onto a screen assembly in the vibratory separator, the screen assembly comprising an ridge-valley series of undulating screening material comprised of a plurality of alternating ridges and valleys of screening material, each of said ridges having two spaced-apart ridge ends, a ridge top and a ridge bottom, and each ridge end comprising a portion of screening material that tapers down from its corresponding ridge's ridge top to a level of screening material at its corresponding ridge's ridge bottom, and separating material from the fluid with the screen assembly.

The present invention, therefore, provides in certain, but not necessarily all embodiments, a screen assembly for a vibratory separator, the screen assembly having a ridge-valley series of undulating screening material comprised of a plurality of alternating ridges and valleys of screening material, each of said ridges having two spaced-apart ridge ends, and each ridge end comprising a seamless portion of screening material; and such a screen assembly wherein said ridge ends are of a generally bulbous shape.

The present invention, therefore, provides in certain, but not necessarily all embodiments, a method for treating fluid with a vibratory separator, the fluid having material therein to be separated therefrom, the method including introducing the fluid onto a screen assembly in the vibratory separator, the screen assembly comprising an undulating ridge-valley series of screening material comprised of a plurality of alternating ridges and valleys of screening material, each of said ridges having two spaced-apart ridge ends, and each ridge end comprising a seamless portion of screening material, and separating material from the fluid with the screen assembly; and such a method wherein said ridge ends are of a generally bulbous shape.

The present invention, therefore, provides in certain, but not necessarily all embodiments, a screen assembly for a vibratory separator, the screen assembly having a ridge-valley series of undulating screening material comprised of a plurality of alternating ridges and valleys of screening material, each of said ridges having two spaced-apart ridge ends, each of said ridges having two spaced-apart bottom edges in a bottom plane, and each ridge end comprising a portion of screening material at a non-perpendicular angle to the bottom plane; and such a screen assembly wherein said ridge ends are of a generally bulbous shape.

The present invention, therefore, provides in certain, but not necessarily all embodiments, a method for treating fluid with a vibratory separator, the fluid having material therein to be separated therefrom, the method including introducing the fluid onto a screen assembly in the vibratory separator, the screen assembly comprising an ridge-valley series of undulating screening material comprised of a plurality of alternating ridges and valleys of screening material, each of said ridges having two spaced-apart ridge ends, each of said ridges having two spaced-apart bottom edges in a bottom plane, and each ridge end comprising a portion of screening material at a non-perpendicular angle to the bottom plane; and such a method wherein said ridge ends are of a generally bulbous shape.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A screen assembly for a vibratory separator, the screen assembly comprising
   a ridge-valley series of undulating screening material comprised of a plurality of alternating ridges and valleys of screening material,
   each of said ridges having two spaced-apart ridge ends, a ridge top and a ridge bottom, and
   each ridge end comprising a portion of screening material that tapers down from its corresponding ridge's ridge top to a level of screening material at its corresponding ridge's ridge bottom.

2. The screen assembly of claim 1 wherein said ridge ends are of a generally bulbous shape.

3. The screen assembly of claim 1 wherein the screening material with the ridge-valley series of undulating screening material has an outer perimeter and wherein an outermost edge of each ridge end at the level of the screening material at the ridge bottom is within the perimeter of the screening material.

4. A method for treating fluid with a vibratory separator, the fluid having material therein to be separated therefrom, the method comprising,
   introducing the fluid onto a screen assembly in the vibratory separator, the screen assembly comprising an ridge-valley series of undulating screening material comprised of a plurality of alternating ridges and valleys of screening material, each of said ridges having two spaced-apart ridge ends, a ridge top and a ridge bottom, and each ridge end comprising a portion of screening material that tapers down from its corresponding ridge's ridge top to a level of screening material at its corresponding ridge's ridge bottom, and
   separating material from the fluid with the screen assembly.

5. The method of claim 4 wherein said ridge ends are of a generally bulbous shape.

6. A screen assembly for a vibratory separator, the screen assembly comprising a ridge-valley series of undulating screening material comprised of a plurality of alternating ridges and valleys of screening material, each of said ridges having two spaced-apart ridge ends, and each ridge end comprising a seamless portion of screening material.

7. The screen assembly of claim 6 wherein said ridge ends are of a generally bulbous shape.

8. A method for treating fluid with a vibratory separator, the fluid having material therein to be separated therefrom, the method comprising, introducing the fluid onto a screen assembly in the vibratory separator, the screen assembly comprising an undulating ridge-valley series of screening material comprised of a plurality of alternating ridges and valleys of screening material, each of said ridges having two spaced-apart ridge ends, and each ridge end comprising a seamless portion of screening material, and separating material from the fluid with the screen assembly.

9. The method of claim 8 wherein said ridge ends are of a generally bulbous shape.

10. A screen assembly for a vibratory separator, the screen assembly comprising a ridge-valley series of undulating screening material comprised of a plurality of alternating ridges and valleys of screening material, each of said ridges having two spaced-apart ridge ends, each of said ridges having two spaced-apart bottom edges in a bottom plane, and each ridge end comprising a portion of screening material at a non-perpendicular angle to the bottom plane.

11. The screen assembly of claim 10 wherein said ridge ends are of a generally bulbous shape.

12. A method for treating fluid with a vibratory separator, the fluid having material therein to be separated therefrom, the method comprising, introducing the fluid onto a screen assembly in the vibratory separator, the screen assembly comprising an ridge-valley series of undulating screening material comprised of a plurality of alternating ridges and valleys of screening material, each of said ridges having two spaced-apart ridge ends, each of said ridges having two spaced-apart bottom edges in a bottom plane, and each ridge end comprising a portion of screening material at a non-perpendicular angle to the bottom plane.

13. The method of claim 12 wherein said ridge ends are of a generally bulbous shape.

\* \* \* \* \*